United States Patent
Nakanishi

(10) Patent No.: US 7,467,053 B2
(45) Date of Patent: Dec. 16, 2008

(54) THREE-DIMENSIONAL FOURIER TRANSFORM PROCESSING METHOD FOR SHARED MEMORY SCALAR PARALLEL COMPUTER

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 11/452,360

(22) Filed: Jun. 14, 2006

(65) Prior Publication Data
US 2007/0208795 A1    Sep. 6, 2007

(30) Foreign Application Priority Data
Mar. 6, 2006    (JP)    ............................. 2006-058875

(51) Int. Cl.
*G01R 23/16*    (2006.01)

(52) U.S. Cl. ........................................................ 702/77

(58) Field of Classification Search .................... 702/77
See application file for complete search history.

(56) References Cited
OTHER PUBLICATIONS

Charles Van Loan, Computational Frameworks for the Fast Fourier Transform, Society for Industrial and Applied Mathematics, Philadelphia, 1992, pp. vii-xiii, 1-121, 188-205.

*Primary Examiner*—Bryan Bui
*Assistant Examiner*—Stephen J Cherry
(74) *Attorney, Agent, or Firm*—Staas & Halsey LLP

(57) ABSTRACT

When a three-dimensional Fourier transform is performed on the data x (i, j, k), the Fourier transform is performed on each two-dimensional plane formed by a first dimension and a second dimension (two-dimensional array defined by i and j). Since data is stored in a continuous area in the direction in which index i expressing the first dimension continues, the transform of the first dimension is performed such that i can be continuous. When the Fourier transform of the second dimension expressed by j is performed, data is accessed such that i can continuously changes not by continuously changing j. The Fourier transform of the third dimension is performed with i continuously changed on each plane defined by i and k. Reversed bits are obtained by simultaneously exchanging the first dimensions and the second dimensions.

13 Claims, 24 Drawing Sheets

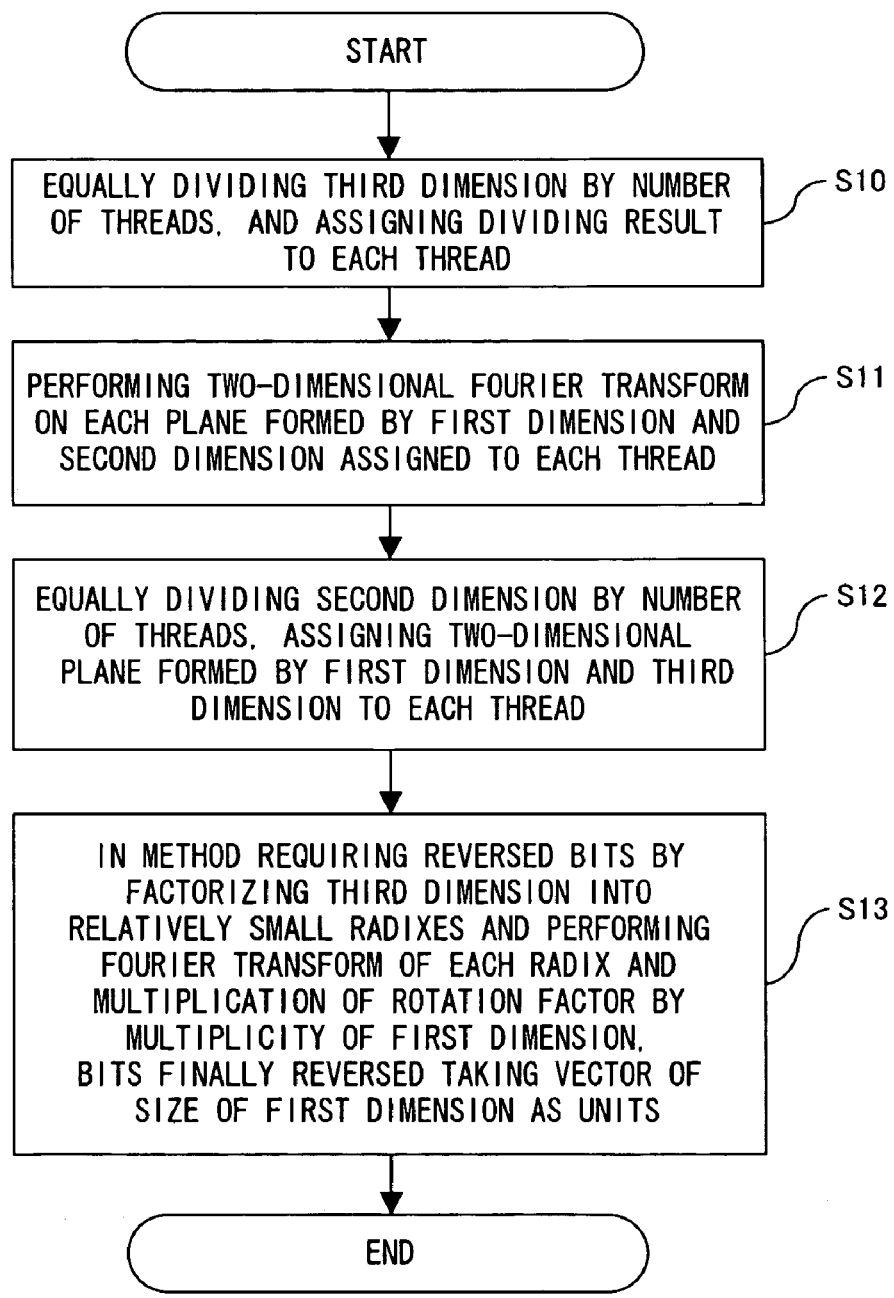
F I G. 2

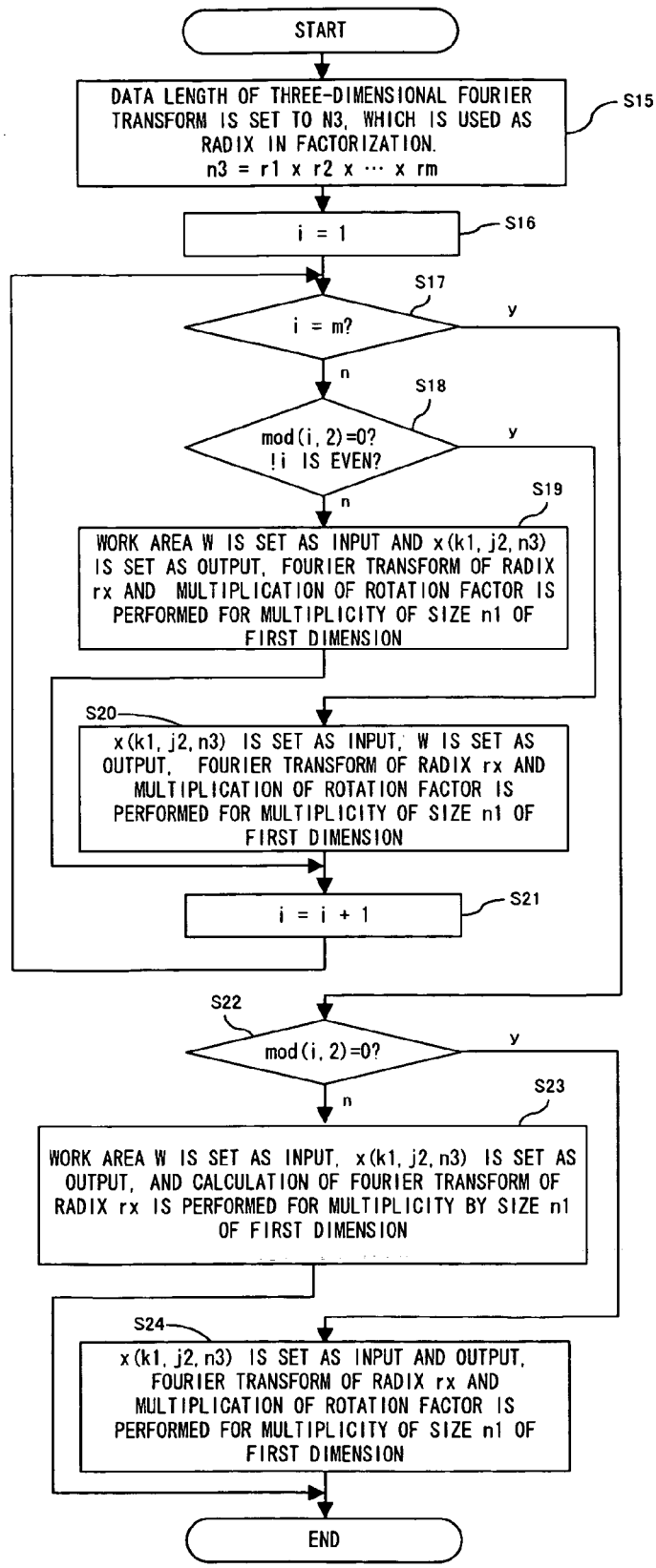
F I G. 3

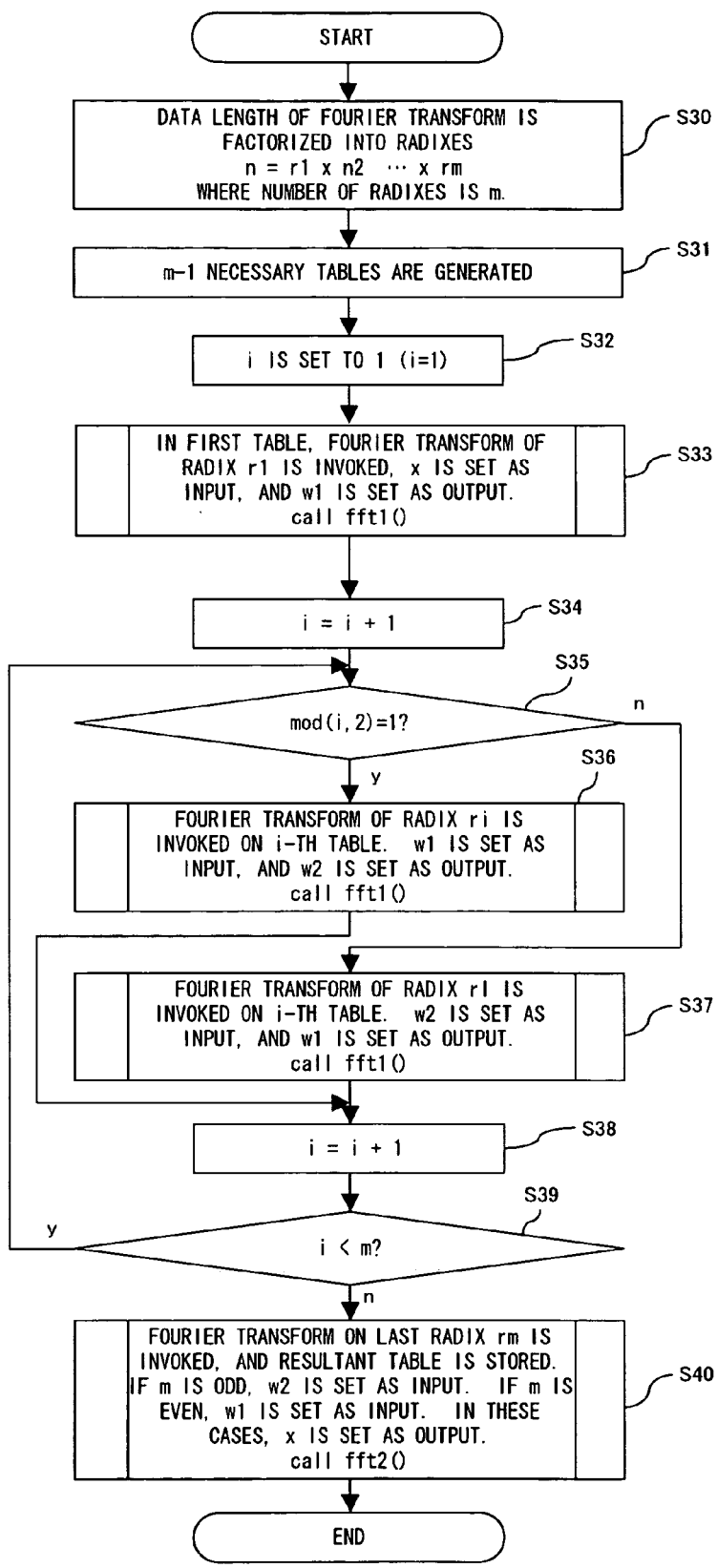
F I G. 4

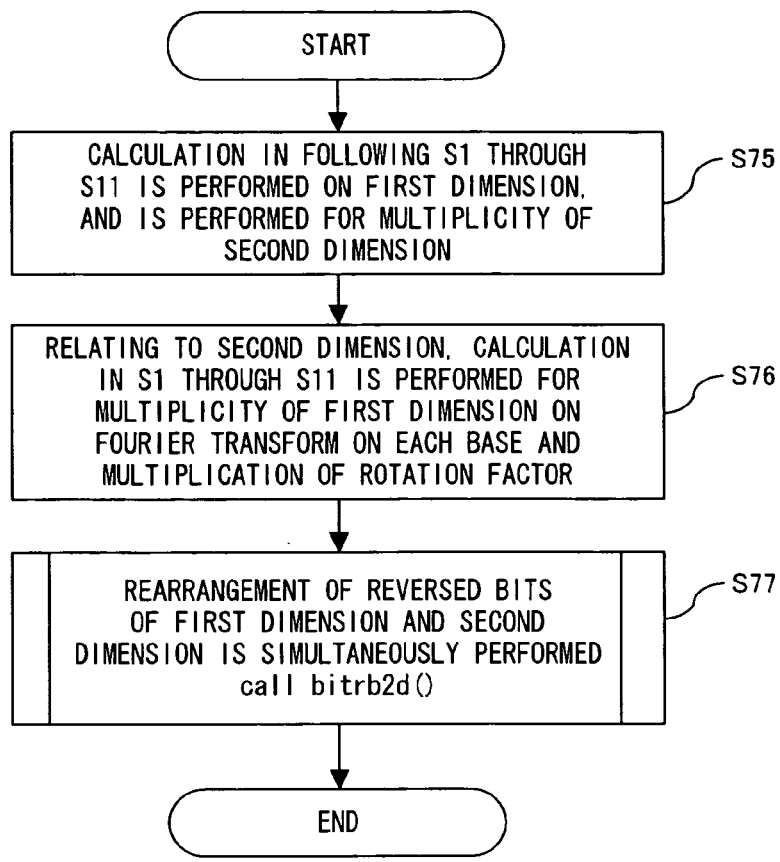
F I G. 7

THREE-DIMENSIONAL FOURIER TRANSFORM PROCESSING METHOD FOR SHARED MEMORY SCALAR PARALLEL COMPUTER

BACKGROUND OF THE INVENTION

1. Field of the Invention

The present invention relates to a method for processing at a high speed a three-dimensional Fourier transform using a shared memory scalar parallel computer.

2. Description of the Related Art

Recently, a shared memory scalar parallel computer has been widely used in various fields of scientific technological calculation especially in a fluid analysis, astronomic physics, a weather forecast, a collision analysis, an image analysis, etc. When a shared memory scalar parallel computer is used in these fields, the fast performance of a multidimensional Fourier transform is demanded to quickly process a large-scale problem.

Additionally, with the progress of computer technology, the architecture of a scalar CPU of a shared memory scalar parallel computer has been changed.

In an Itanium 2 processor adopted by PRIMEQUES, 128 floating point registers are provided. The cache and memory access time is relatively high. The Fourier transform method developed for Sparc, etc. has been a method for configuring a multidimensional Fourier transform based on a fast one-dimensional transform. A Sparc system has a 2-stage cache, that is, cache L1 and L2, and the access speed of the cache L2 is faster than that of the cache L1. Therefore, the calculating method by holding data in the relatively small cache L1 is advantageous.

Refer to the non-patent document 1 for the explanation of a common fast Fourier transform.

[Non-patent Document 1] Charles Van Loan, "Computational Frameworks for the Fast Fourier Transform", Society for Industrial and Applied Mathematics, 1992

The Fourier transform method developed for the Sparc is not sufficient to improve to the utmost the performance of the high-performance CPU of a relatively fast machine especially in continuous access of memory access cache of a large capacity with sufficient registers. Furthermore, since the number of registers is relatively small in the Sparc, there occurs the problem that processing is delayed due to the insufficient registers in using the method of improving the arithmetic density using a larger radix and loading the memory access before the timing required in various types of calculation.

It is important to find a method of high Fourier transform in a computer system having a CPU that has a relatively large number of registers such as the Itanium 2 processor, holds much data in the registers, performs high-speed calculation, performs fast continuous access to the data of memory cache, and has a large capacity of cache.

SUMMARY OF THE INVENTION

The present invention aims at providing a method of performing a three-dimensional Fourier transform appropriate for a high-speed processor having a large number of registers for continuous access to the data in the memory cache.

In the three-dimensional Fourier transform processing method for use with a shared memory scalar parallel computer which stores, in a continuously area, data in the direction in which i of input data x (i, j, k) is continuously arranged where the index of the first dimension is i, the index of the second dimension is j, and the index of the third dimension is k in the high-speed access to the continuous data area, each unit of two-dimensional array data x (i, j, *) (* is a possible optional value of k) having the indexes i and j is loaded into cache, the Fourier transform of the first dimension in the direction in which the index i changes is performed for the multiplicity in the j direction with the i continuously changed, the Fourier transform of the second dimension in the direction in which the index j changes is performed for the multiplicity in the i direction with the arithmetic in the direction in which the i continuously changes with priority, and the Fourier transform of the third dimension in the direction in which the index k changes is performed.

The present invention can provide a method of performing a three-dimensional Fourier transform appropriate for a fast processor having a large number of registers for continuous access to the data in memory cache.

BRIEF DESCRIPTION OF THE DRAWINGS

FIG. 2 is a flowchart for explanation of the process of a three-dimensional Fourier transform according to an embodiment of the present invention;

FIG. 3 is a flowchart of the process of the Fourier transform of the third dimension;

FIG. 4 is a flowchart of the one-dimensional Fourier transform in which an access pattern is continuous, the final loop rearrangement is simultaneously performed using the same pattern, and data is pre-read according to an embodiment of the present invention;

FIG. 7 is a flowchart for explanation of the method for simultaneously performing a rearrangement of reversed bits in a two-dimensional transform;

DESCRIPTION OF THE PREFERRED EMBODIMENTS

Figure 1:
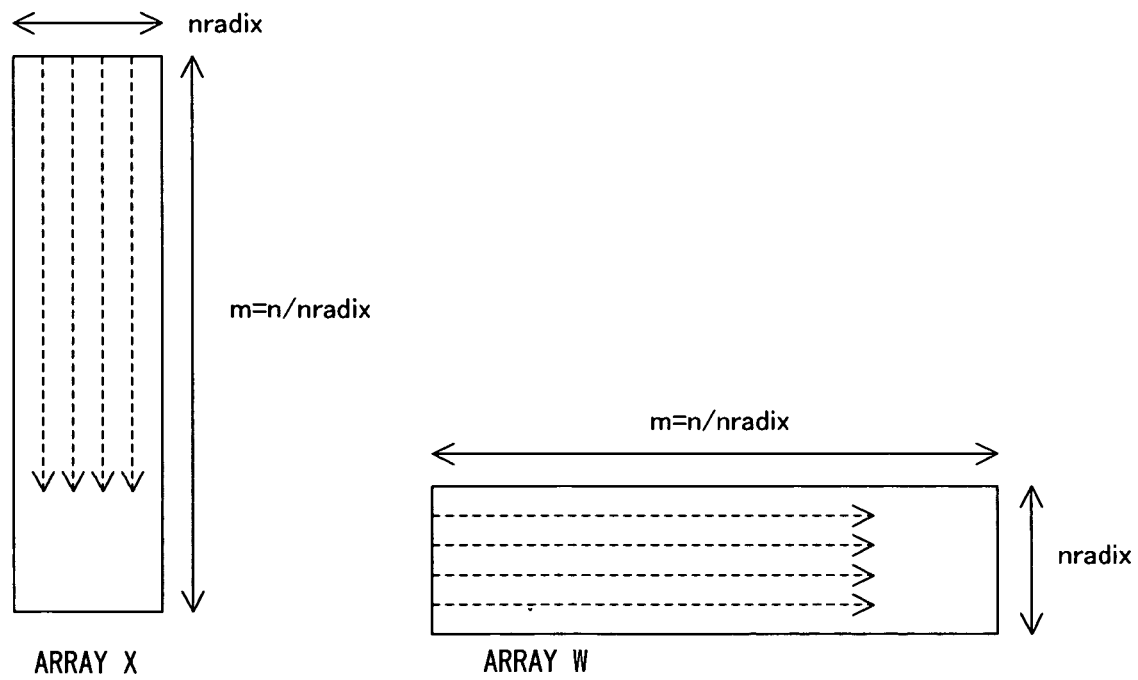
FIG. 1 is an explanatory view of performing a Fourier transform of the two-dimensional plane according to an embodiment of the present invention.

In the embodiments of the present invention, more Fourier transforms are performed in a multiplex mode than by constituting a Fourier transform for a scalar computer on a one-dimensional transform basis. That is, a transform is performed on each plane of a combination of the first dimension and the second dimension, and then the transform of the third dimension is performed. Especially, when a transform of the third dimension is performed, a plane formed by the first dimension and the third dimension is considered. Thus, since the data access in the multiplicity direction of the first dimension is continuously performed, the multiple Fourier transform in the direction in which the data access is continuously performed is considered. The transform of the third dimension is performed by fixing the second dimension and performing a Fourier transform on the plane formed by the first dimension and the third dimension.

Especially, in the Fourier transform of the third dimension, a Fourier transform is divided into Fourier transforms of some radixes. At this time, the transform for each radix is performed by multiple transforms using the multiplicity of the first dimension.

(1) The multiple transforms for a plane formed by the third dimension and the first dimension can derive the fast performance of continuous access by performing calculation using a relatively small radix with the number of WAY of the cache taken into account. When a large radix is used, the access performance from memory is degraded from the collision due to the number of WAY of the cache. That is, the Fourier transform can be performed on each factor when the data length of each dimension to be transformed is analyzed into appropriate factors. The calculation is performed on the data length by repeatedly performing the Fourier transform on the size of a radix by analyzing the data length. For example, when the data length is represented by the factorial of 2, a Fourier transform can be performed on the data length by repeatedly performing the Fourier transform formed by the complex number of radix×radix, namely 2×2 in this example. Therefore, in this case, the complex numbers of radix×radix have to be collectively calculated by a read and a write using cache. However, since the number of pieces of data collectively read and written in the cache is limited by the number of WAY, the amount of data to be processed in the arithmetic operation exceeds the possible amount of read and written data in the cache when the radix exceeds the number of WAY by more than a predetermined value, thereby causing the load of data. Since the data loading speed is lower than the arithmetic speed, the arithmetic speed of the Fourier transform is reduced. Therefore, to perform a fast Fourier transform, it is necessary to make the radix relatively smaller than the number of WAY of the cache.

(2) Especially, it is important to detect the data length represented by some power of 2. In the Cooley-Tukey method, the rearrangement of data of reversed bits is performed after transforming each radix.

In the transform of the second dimension, in rearranging reversed bits, the rearrangement of the second dimension is made by considering that the data refers to the vector of data arranged in the direction of the first dimension. When the vector is rearranged, the rearrangement of data of reversed bits is also made in the vector of the first dimension. Thus, the reversed bits of the first dimension and the second dimension are simultaneously obtained, thereby realizing the rearrangement in the cache register, and possibly reducing the frequency of loading data when bits are reversed.

(3) Likewise, when the Fourier transform of the third dimension is performed using the Cookey-Tukey method which requires rearrangement of data of reversed bits, a radix is transformed by regarding the first dimension as multiplicity on the plane with the second dimension fixed. When the transform is completed on all radixes, the bits are reversed. In this case, the bits are reversed by rearranging each vector of a sequence of data in the direction of the first dimension. When multiple transform is completed on all values of the second dimension, the arithmetic operations of the three-dimensional Fourier transform are completed.

Especially, the last radix is 16, 32, etc. to speed up the calculation using a relatively large radix. However, the collision due to the number of WAY of the cache should be avoided. In the calculation of each radix, the transform of a radix and the arithmetic operation of a rotation factor are collectively performed. The last portion of the arithmetic of the Fourier transform is only the transform of the radix on the continuous areas, the reference to the table for the arithmetic of a rotation factor is not required, thereby realizing a high-speed calculation.

(4) In the calculation of the first dimension and the second dimension, in addition to the above-mentioned method, a considerably large radix is used (however, the collision due to the number of WAY of the cache should be avoided), and the method of not using an arrangement of reversed bits is also effective. In this method, the plane formed by the direction of the first dimension and the direction of the second dimension is a continuous area as an access area of data. The processor based on the present embodiment functions on conditions that access can be fastly attained to continuous areas, sufficiently large cache can store the necessary entire data for an arithmetic operation, and that there are a large number of registers.

(a) The following method is used in the one-dimensional transform.

A data length is factorized. Each factor is a radix. 8 or 16 is used as a radix. The radix is $n_{radix}$, $m=n/n_{radix}$ (n indicates a data length), and the array of $m \times n_{radix}$ is transposed in the array of $n_{radix} \times m$. The row vector of the length $n_{radix}$ of the data to be processed by the Fourier transform is read one by one, the result is multiplied by a rotation factor, the Fourier transform is performed, and the result is stored in the transposed array. The remaining data to be calculated is similarly repeated at the multiple times of the value m of the radix. Relating to the storage of the arithmetic data corresponding to the last row, it is assumed that the value m of the first dimension indicates the ((total number m of radixes)-1)-dimension array, and the order of them is rearranged.

In this access pattern, with respect to the referring, a continuous one-dimensional vector is continuously loaded for the number of radixes, and it is a high-speed pattern.

Furthermore, in the loop in which the Fourier transform for the number of radixes is performed m times, the row vector data to be calculated is loaded in the previous loop and stored in the register. Thus, the data can be loaded, and simultaneously the calculation can be performed because there are sufficient number of registers. When the radix is larger, the number of pieces of data read in one referencing operation increases. Therefore, since the calculation complexity for the data loaded in one referencing operation increases, the load of data can be completed during the first previous arithmetic operation. Although the calculation complexity in one loading operation increases, the number of registers to be used in the arithmetic operation and the number of registers used in the loading operation in advance does not exceed the total number of registers of the CPU.

Relating to the transform of the second dimension, the multiplicity of the first dimension is processed first. In the multiplex portion, the Fourier transform is repeated for the number of radixes. During the repetition, data can be read in advance.

The description above means that when the data to be processed in the three-dimensional Fourier transform is stored in the array w (i, j, k), the data in which the index i of the first dimension continues is continuously stored in the storage area. Therefore, if the index i of the first dimension is continuously accessed, the process can be performed at a high speed because the processor according to the present embodiment of the present invention can perform continuous access fast. When the Fourier transform of the first dimension is performed, the calculation is performed with "i" continuously changed. When the calculation of the second dimension is performed, it is normally performed sequentially with "j" continuously changed. However, in the embodiment of the present invention, the loop of continuously changing "i" is included in the loop of continuously changing "j", and also in the Fourier transform of the second dimension, "i" of the first dimension is continuously changed, and the data access is set as continuous access, thereby aiming at a high-speed process.

(5) In the case of mixed bases:

When mixed bases are used (a plurality of different bases are used), the transform of each base, the multiplication of a rotation factor, and the transposition are combined to transform each base. At this time, an input area and an output area are required. Therefore, the first dimension and the second dimension are regarded as one plane formed by the direction of the first dimension, and a transform is performed on the plane. The transform of the second dimension is performed by reserving a work area having the same size as in the transform of the first dimension, and regarding each base of the first dimension as the multiplicity. The input/output of a Fourier transform is performed by switching between the area in which data is stored and the work area.

The following Fourier transform is used.

The calculation can be performed in the following four steps when the data length n is factorized as p×q.

step 1: Assume that the storage area x has a two-dimensional array of x (p, q). The Fourier transform of the length q relating to the first dimension (index of p) is performed for the multiplicity p.

step 2: The element x(i,j) of x(p,q) is multiplied by ω**(i*j) where ω=exp(−2π/n).

step 3: x(p,q) is transposed and stored in w(q.p)

step 4: On the second dimension (index of q) of w, the Fourier transform of the length p is performed for the multiplicity q.

When q is small and p is large, the factorization on the two factors is performed by repeatedly and recursively providing for the transform of the length p of step 4, thereby calculating the Fourier transform of the length n by the combination of the Fourier transforms of short lengths.

When mixed bases are used, the following Fourier transform is used.

The data length n is factorized into multiplication of p radixes. $n = n_1 \times n_2 \times \ldots \times n_p$ s1: $m \leftarrow n/n_p$ s2: The one-dimensional area in which data is stored is regarded as a two-dimensional array of $x(m, n_p)$ s3: The Fourier transform of the radix $n_p$ of the second dimension is performed for the multiplicity m.

s4: $x(m, n_p)$ is multiplied by a rotation factor.

s5: x is transposed and stored in $w(n_p, m)$.

s6: "m" is factorized into two-dimensional as $(m/n_{p-1}, n_p-1)$. Therefore, the update to $m \leftarrow m/n_{p-1}$ is performed.

s7: The data is raised by one dimension to $w(n_p, m, n_p-1)$, and the calculation in the following STEP 1 is applied.

STEP 1: First, the Fourier transform of $n_{p-1}$ of the third dimension is performed for the multiplicity $n_p \times m$.

s8: $w(*, m, n_{p-1})$ is multiplied by the rotation factor. * indicates an optional value equal to or more than 0 and equal to or less than $n_p$.

s9: The second dimension is exchanged for third dimension (transposition).

$x(n_p, n_p-1, m) \leftarrow w(n_p, m, n_p-1)$ s10: The arrays x and y are exchanged as input/output, m is factorized into multiplication by the next radix, thereby repeating the Fourier transform.

s11: When the Fourier transform is performed on the last radix, and when the total number of radixes is even, the data to be transformed is stored in w. When the total number of radixes is odd, the data to be transformed is stored in x. The last multiple transform outputs data to x when the data to be transformed is stored in w, and outputs data to x when the data to be transform is stored in x.

In the transform of the second dimension, the product of the Fourier transform and the rotation factor relating to each radix is further obtained for the multiplicity of the first dimension. Therefore, the work area w is to be $n_1 \times n_2$ including the additional size for the multiplicity of the first dimension.

Similarly, the Fourier transform of the third dimension is also performed as multiple transform, and the calculation is performed with the second dimension fixed, and the first dimension defined as multiplicity. When the multiple transform on all values of the second dimension is completed, the three-dimensional Fourier transform process terminates.

Furthermore, the calculation of each radix includes the repetition for the multiplicity. Therefore, high-speed performance can be derived by reading in advance the next necessary data in the first previous repeating process.

The above-mentioned method can derive the performance twice as strong as the performance obtained by applying the code for the Sparc to the Itanium 2 processor.

Described below in more detail is an embodiment of the present invention.

(1) When the radix is some power of 2:

The first dimension is regarded as a radix-dimensional row vector as described above excluding the rearrangement of reversed bits, and the Fourier transform and the multiplication of a rotation factor are performed. Next, on the second dimension, the Fourier transform of the second dimension and the multiplication of the rotation factor are performed using the first dimension as the multiplicity. The calculations are performed using the radixes such as 2, 4, 8, etc. Using the $n_{radix}$ as a radix and $m = n/n_{radix}$, as a two-dimensional array of $m \times n_{radix}$, each row is converted by the Fourier transform having the radix of $n_{radix}$ and multiplied by the rotation factor. The result is rearranged in the order of reversed bits.

Next, the $n_{radix}$ is updated with m updated to such as $m \leftarrow m/n_{radix}$. The first previous $n_{radix}$ vectors having the length of m is similarly regarded as a two-dimensional array, and is converted by the Fourier transform and multiplied by the rotation factor. On the second dimension, the calculation is performed by continuous access using the first dimension as the multiplicity.

Regarding the reversed bits, a pair of elements to be exchanged is generated, and a list is prepared. The list is prepared as follows. When the order of the Fourier transform is n, m=log 2(n).

A) Bits are reversed for each of the indexes i, j, and k of the data w(i,j,k) after the Fourier transform and the multiplication of the rotation factor. When the total number of bits of i is odd, i is divided into five portions, and the leftmost bit is the highest order bit.

An index is represented by bits, and is divided into five portions B1|C|B2|A|B3 starting from the highest bit. B1, B2, and B3 are assigned bit by bit, and A and C include the same number of bits a) When A is different from CR:

Assume that A includes m bits, and is changed from 0 to 2\*\*m−1.

Bit-reversed A is expressed by AR. Bit-reversed C is expressed by CR.

All Cs that hold A>CR are generated. Then, the bit string C|A and the bit string AR|CR have different values.

The right halves of the bit strings C|A and AR|CR generate what satisfy A>CR. These two bit strings generate all index values The generated pairs (C|A and AR|CR) indicate all combinations.

If there are redundant pairs, assuming that two pairs (C|A and AR|CR) and (C2|A2 and A2R|C2R) match each other leads as follows.

Since A is sequentially generated, A2>A. Since they match, CR has to match A2. Then, CR>A. However, the bit string C|A and AR|CR are generated such that A>CR. Therefore, there occurs inconsistency. Therefore, there are no redundant pairs.

That is, since any 3-bit string B=B1|B2|B3 is acceptable, 0 through 7 are generated, and B1|C|B2|A|B3 is generated. Reversed bits are described as follows.

B3|AR|B2|CR|B1 b) When A matches CR:

Therefore, AR matches C. Accordingly, C|A and AR|CR are the same bit strings. As a result, if B1|C|B2|A|B3 is to be a different bit string from B3|AR|B2|CR|B1, B =B1|B2|B3 refers to asymmetric. That is, if BR can be obtained as bit-reversed B, B is not equal to BR (B≠BR). It can be determined by checking a practical pattern of 3-bit B.

The pair of a) and b) is generated and stored in a table, and the bits are rearranged.

B) When the total number of bits of an index is even:

One bit is added to the total number of bits of the central B2 into two bits when the number is even.

a) When A is different from CR:

Assume that A includes m bits, and is changed from 0 to 2\*\*m−1.

Bit-reversed A is expressed by AR. Bit-reversed C is expressed by CR.

All Cs that hold A>CR are generated. Then, the bit strings C|A and AR|CR do not match.

The right halves of the pairs generate what satisfy A>CR and all of them are generated.

The generated pairs (C|A and AR|CR) indicate all combinations.

If generated pairs are redundant, assuming that two pairs (C|A and AR|CR) and (C2|A2 and A2R|C2R) match each other leads as follows.

Since A is sequentially generated, A2>A.

Since they match, CR has to match A2. Then, CR>A, and there occurs inconsistency. Therefore, the assumption is wrong, and there are no redundant pairs.

That is, since any 4-bit string B=B1|B2|B3 is acceptable, 0 through 15 are generated, and B1|C|B2|A|B3 is generated. Reversed bits are described as follows.

B3|AR|B2|CR|B1 b) When A matches CR:

If B1|C|B2|A|B3 is to be a different bit string from B3|AR|B2R|CR|B1, B=B1|B2|B3 should be asymmetric. That is, if BR can be obtained as bit-reversed B, B is not equal to BR (B≠BR). It can be determined by checking a practical pattern of 4-bit B.

The pair of a) and b) is generated and stored in a table, and the indexes are rearranged.

The rearrangement of the index of the second dimension is performed as follows. When the rearrangement of the second dimension is performed, the vector in the direction of the first dimension is used. Therefore, the column vectors to be rearranged are copied into the vectors V and W. When the copies are made, the first dimension is rearranged on the vector. The resultant vectors V and W whose first dimensions are rearranged are also exchanged and stored in the original column vector.

Relating to the second dimension, no rearrangement is required in the following case.

A Matches CR, and B Matches BR:

For the vector in this case, the first dimension is rearranged.

For the third dimension, after performing the Fourier transform with the first dimension regarded as the multiplicity as with the second dimension, the column vector in the direction of the first dimension as with the second dimension is performed as the rearrangement of the third dimension.

(2) Method of reading necessary data in advance in the method requiring no reversed bits As the order n, for the radix $n_{radix}$ as m=n/$n_{radix}$ (n indicates a data length), regarding as the two-dimensional array of m×$n_{radix}$, each row vector is converted by a Fourier transform and multiplied by a rotation factor. The storage of data after the Fourier transform is performed in the order of the storage of the Fourier transform of the radix.

Then, the transposition is performed to the array of $n_{radix}$× m, and the result is stored. In the repeating process, the reference of data to be processed in the Fourier transform is loaded in the first previous calculation. The radixes of 8 and 16 whose arithmetic complexity is intermediate are appropriate in the Itanium 2.

In the last Fourier transform of the repetitive arithmetic, it is assumed that the value m represents the dimension of the ((number of radixes)-1)-dimensional array, and the rearrangement of the dimensions is performed. That is, the dimensions of the data after the arithmetic operation are rearranged in the reverse order such as A(I1, I2, I3)→A(I3, I2, I1), etc., thereby calculating a Fourier transform.

In the two-dimensional transform, the transform of the first dimension is performed by applying the above-mentioned method and performing the repetitive calculation of the transform of the first dimension for the multiplicity of the size of the second dimension. When the transform of the second dimension is calculated for the multiplicity of the size of the first dimension, the radix is considerably large. Therefore, the one-dimensional transform is performed by storing it in the one-dimensional array larger than in the Fourier transform.

Otherwise, the method using a smaller radix is applied to the transform of the second dimension in performing a Fourier transform. When a method not using the rearrangement of reversed bits is used, it is necessary to assign the work areas of the same size.

The Fourier transform of the third dimension is also performed with the first dimension used as the multiplicity. At this time, the method of using a relatively small radix is selected. Thus, the selection enables high-speed memory access and high efficiency maintenance of data in cache.

FIG. 1 is an explanatory view of the Fourier transform on the two-dimensional plane according to an embodiment of the present invention.

When n is a data length, and $n_{radix}$ is a radix, a row vector is sequentially retrieved from the array X of $m \times n_{radix}$, a Fourier transform and a multiplication of a rotation factor is performed on the radix, and the result is stored in the transposed array (array of the $n_{radix} \times m$). In the repeating process, the data to be referenced is loaded in the first previous repetition to perform calculation during the wait time for the load of data. It can be realized by sufficient registers.

Next, W and X are exchanged and a transform is performed on the column vector of the next radix length in the same access pattern (in the array W, the column vector is sequentially retrieved) as an array of the same form.

In the last repetitive arithmetic, X is regarded as the multidimensional array $x$ $(p_2, p_3, \ldots, p_n, p_1)$ of the number of radixes, and W is regarded as $w$ $(p_n, p_{n-1}, \ldots, p_2, p_1)$, and the data is rearranged for storage in the reverse order other than the highest order dimension.

Other than the last repetitive arithmetic, the calculation can be made with the same access pattern and continuous access, thereby realizing high-speed calculation.

FIG. 2 is a flowchart of the process of the three-dimensional Fourier transform according to an embodiment of the present invention.

In FIG. 2, in step S10, the third dimension is evenly divided by the number of threads for assignment to each thread. In step S11, the two-dimensional Fourier transform is performed on each plane formed by the first dimension and the second dimension assigned to each thread. In step S12, the second dimension is evenly divided by the number of threads, and the two-dimensional plane formed by a first dimension and a third dimension is assigned to each thread. In step S13, the third dimension is factorized into relatively small radixes, and the Fourier transform of each radix and the multiplication of a rotation factor are performed using the multiplicity of the first dimension. If bit-reverse is required, the bit-reverse is performed for a vector of the size of the first dimension at last.

FIG. 3 is a flowchart of the process of the Fourier transform of the third dimension shown in FIG. 2.

In the Fourier transform of the third dimension of the three-dimensional FFT, the portion assigned to each thread is defined as follows.

The portions obtained by evenly dividing the size of the second dimension are assigned to the respective threads. The first and last portions are n2ds and n2de. The Fourier transform to each base is calculated on the plane formed by the first dimension and the third dimension having the multiplicity of the first dimension. Assume that data is stored in the array of x(k1,n2,n3). The second dimension is fixed to $j2 \in [n2ds, n2de]$ for calculation. In the method not requiring rearrangement of reversed bits, the two-dimensional work area of w(k1,n3) is required.

In FIG. 3, in step S15, the data length of the three-dimensional Fourier transform is set to $n_3$, which is used as a radix in the factorization.

$$n_3 = r_1 \times r_2 \times \ldots \times r_m$$

In step S16, i is set to 1 (i=1). In step S17, it is determined whether or not i is m. If the determination in step S17 is YES, control is passed to step S22. If the determination in step S17 is NO, it is determined in step S18 whether or not i is even, that is, the remainder of i and 2 (mod) is 0. If the determination in step S18 is YES, control is passed to step S20. If the determination in step S18 is NO, in step S19, the work area W is set as input and x(k1,j2,n3) is set as output, the Fourier transform of the radix $r_x$ and the multiplication of the rotation factor are performed for the multiplicity of the size n1 of the first dimension, and control is passed to step S21. In step S20, x(k1,j2, n3) is set as input, w is set as output, the Fourier transform of the radix $r_x$ and the multiplication of the rotation factor are performed for the multiplicity of the size n1 of the first dimension, and control is passed to step S21. In step S20, x(k1,j2, n3) is set as input, w is set as output, the Fourier transform of the radix $r_x$ and the multiplication of the rotation factor are performed for the multiplicity of the size n1 of the first dimension, and control is passed to step S21. In step S21, i is increased by 1, and control is returned to step S17.

In step S22, it is determined whether or not i is even. If the determination in step S22 is YES, control is passed to step S24. If the determination in step S22 is NO, control is passed to step S23. In step S23, the work area W is set as input, x(k1,j2,n3) is set as output, and the calculation of the Fourier transform of the radix $r_x$ is performed for the multiplicity by the size $n_1$ of the first dimension, thereby terminating the process. In step S24, x(k1,j2,n3) is set as both input and output, and the calculation of the Fourier transform of the radix $r_x$ and the multiplication of the rotation factor is performed for the multiplicity by the size $n_1$ of the first dimension, thereby terminating the process.

FIG. 4 is a flowchart of the one-dimensional Fourier transform according to an embodiment of the present invention in which an access pattern is continuous, the last loop is rearranged simultaneously using the same pattern, and data is read in advance.

Basically, the radix is to be 8 or more to derive the effect of reading data in advance.

First, in step S30, the data length of the Fourier transform is factorized into radixes as follows.

$$n = r_1 \times r_2 \times \ldots \times r_m$$

where the number of radixes is m.

In step S31, m−1 necessary tables are generated. Next, in step S32, i is set to 1 (i=1). In step S33, in the first table, the Fourier transform of radix $r_1$ is invoked, x is set as input, and w1 is set as output. The process is performed by invoking the subroutine fft1. In step S34, i is increased by 1. In step S35, it is determined whether or not the remainder of i and 2 is 1 (it is determined whether or not i is odd). When the determination in step S35 is YES, control is passed to step S36. If the determination in step S35 is NO, control is passed to step S37. In step S36, the Fourier transform of the radix $r_1$ is invoked on the i-th table. W1 is set as input, and w2 is set as output. This process is performed by invoking the subroutine fft1. In step S37, the Fourier transform of the radix $r_i$ is invoked on the i-th table. W2 is set as input, and w1 is set as output. In this case, the subroutine fft1 is invoked. In step S38, i is increased by 1. In step S39, it is determined whether or not i<m. If the determination in step S39 is YES, control is returned to step S35. If the determination in step S39 is NO, in step S40, the Fourier transform on the last radix $r_m$ is invoked, and the resultant table is stored. If m is odd, w2 is set as input. If m is even, w1 is set as input. In these cases, x is set as output. In this example, the subroutine fft2 is invoked.

Figure 5:
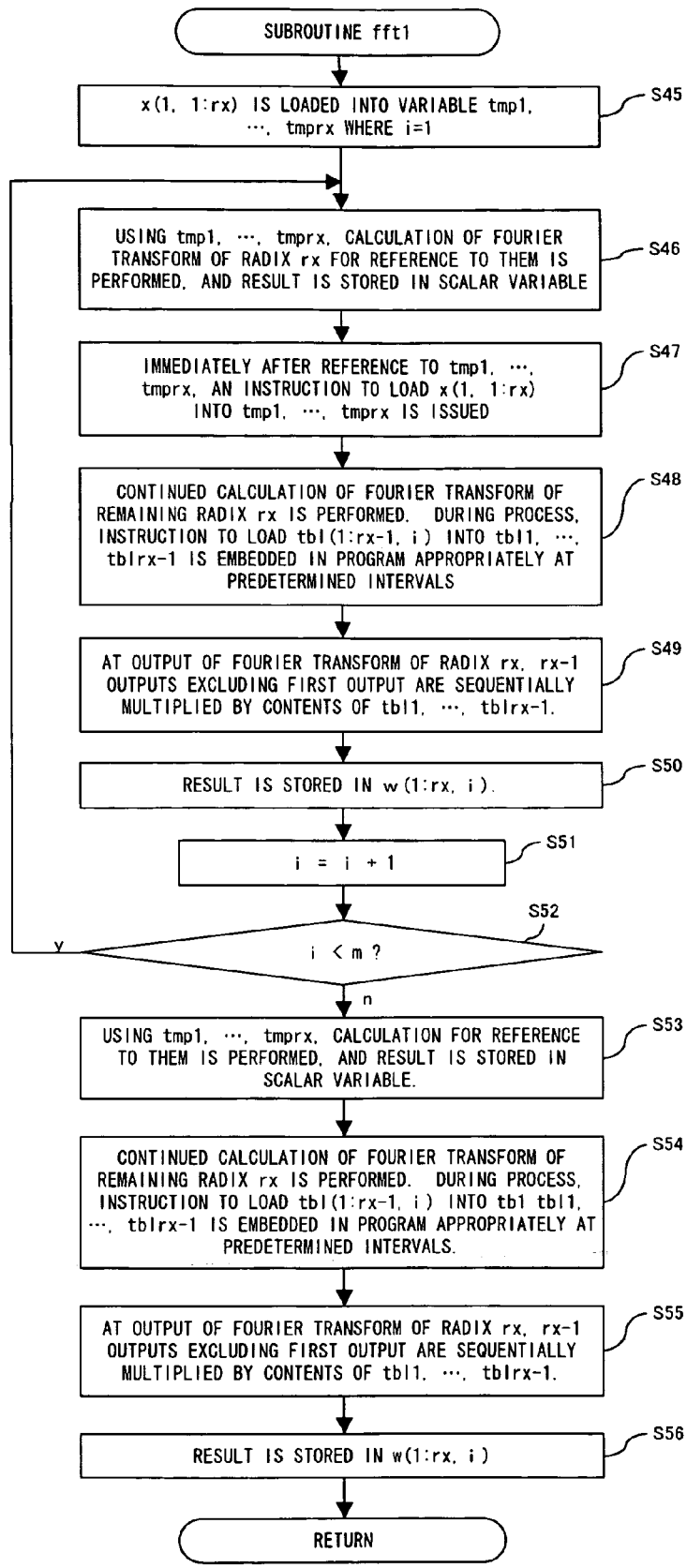
FIG. 5 is a flowchart of the process of a subroutine fft1.

FIG. 5 is a flowchart showing the process of the subroutine fft1.

In the processor having 128 or more floating point registers such as the Itanium 2, if a program is written in a high-level language such as Fortran using a scalar variable, then a code using a register is generated while there are sufficient registers. It is assumed that the variables are assigned the respective registers. When the radix is $r_1$, and the length of the data to be transformed is n, m equals $n/r_x$. the array of the input is set as $x(m, r_x)$, the output is $w(r_x, m)$. The table $tb(1:r_{x-1}, m)$ storing a rotation factor is also assumed to be input of the subroutine.

In step S45, $x(1, 1:r_x)$ is loaded into the variable tmp1, ..., tmprx where $1:r_x$ means the respective values of 1 through $r_x$. The i is set to 1. In step S46, using tmp1, ..., tmprx, the calculation for reference to them is performed, and the result is stored in the scalar variable. In step S47, immediately after the reference to tmp1, ..., tmprx, an instruction to load $x(i+1, 1:r_x)$ into tmp1, ..., tmprx is issued. The load can be described by a simple substitute sentence. In step S48, the continued calculation of the Fourier transform of the remaining radix $r_x$ is performed. During the process, the instruction to load $tbl(1:r_{x-1},i)$ into tbl tbl1, ..., tblrx-1 is embedded in the program appropriately at predetermined intervals. In step S49, at the output of the Fourier transform of the radix $r_x$, the $r_{x-1}$, outputs excluding the first output are sequentially multiplied by the contents of tbl1, ..., tblrx-1. In step S50, the result is stored in $w(1:r_x, i)$. In step S51, i is increased by 1. In step S52, it is determined whether or not i<m. If the determination in step S52 is YES, control is returned to step S46. If the determination in step S52 is NO, in step S53, using tmp1, ..., tmprx, the calculation for reference to them is performed, and the result is stored in the scalar variable. In step S54, the continued calculation of the Fourier transform of the remaining radix $r_x$ is performed. During the process, the instruction to load $tbl(1:r_{x-1},i)$ into tbl tbl1, ..., tblrx-1 is embedded in the program appropriately at predetermined intervals. In step S55, at the output of the Fourier transform of the radix $r_x$, the $r_{x-1}$ outputs excluding the first output are sequentially multiplied by the contents of tbl1, ..., tblrx-1. In step S56, the result is stored in $w(1:r_x, i)$, thereby exiting from the subroutine.

Figure 6:
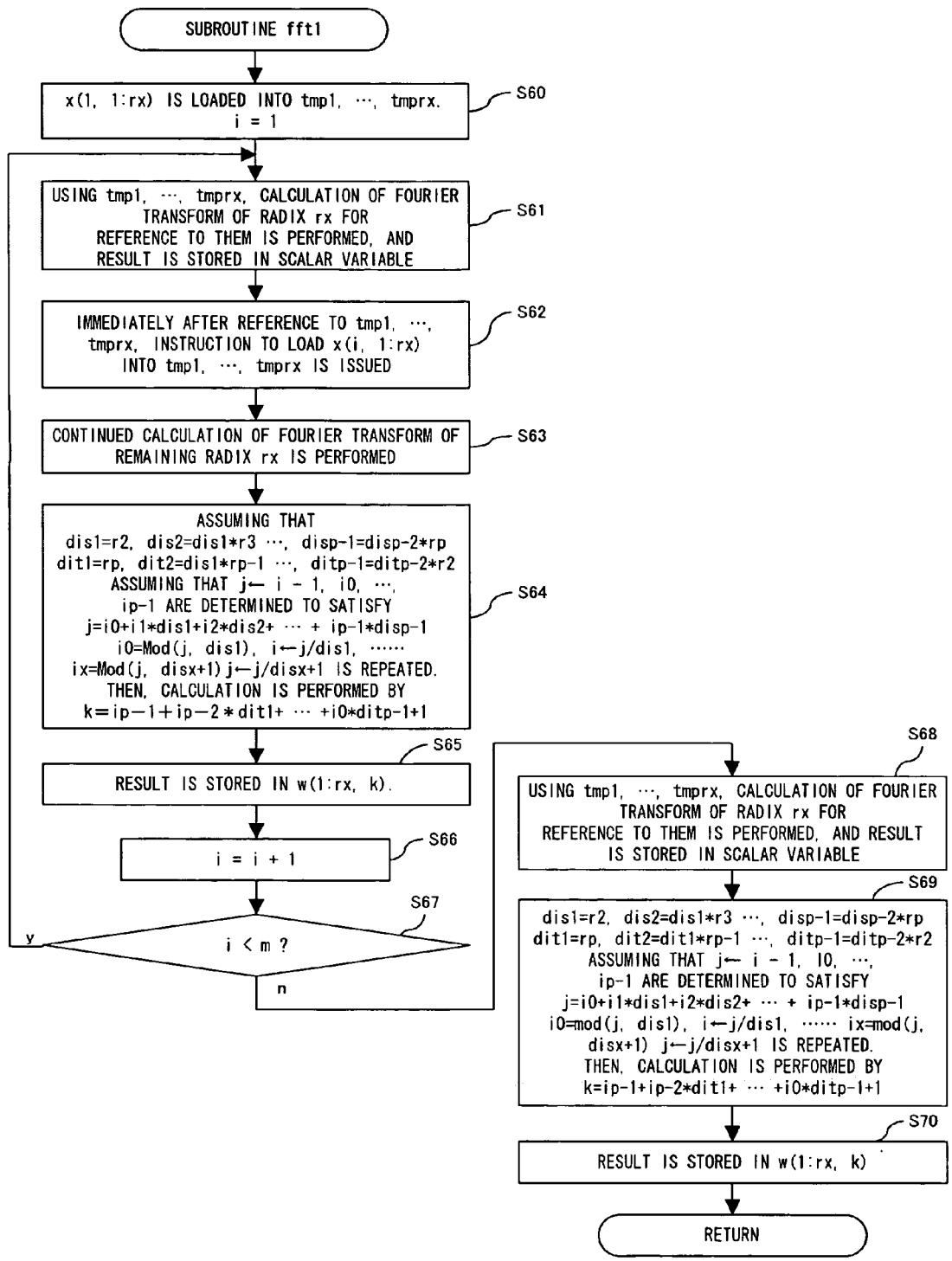
FIG. 6 is a flowchart for explanation of the process of a subroutine fft2 according to an embodiment of the present invention.
Figure 8:
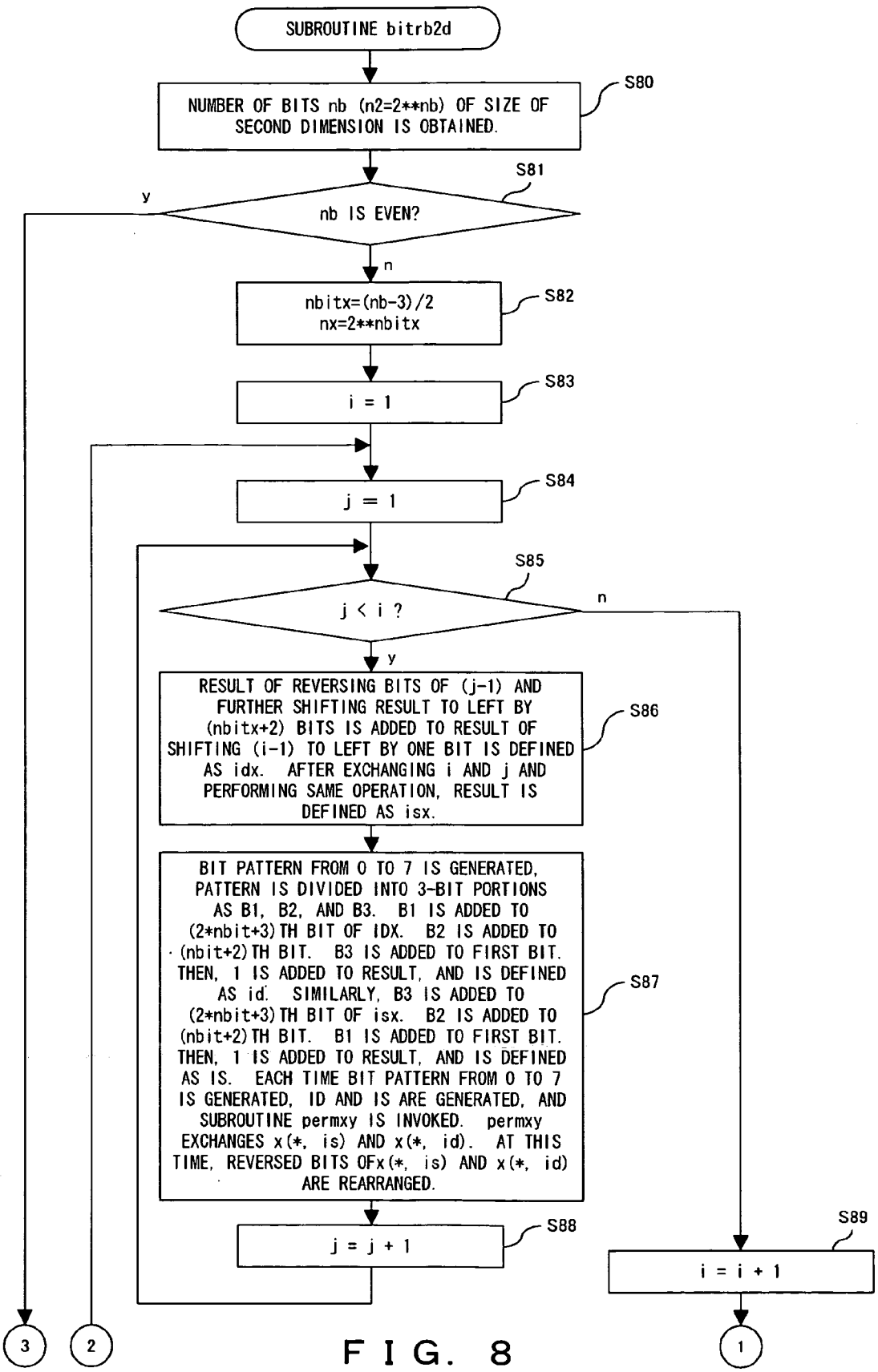
FIG. 8 is a flowchart (1) for explanation of the process of subroutine bitrb2d.
Figure 9:
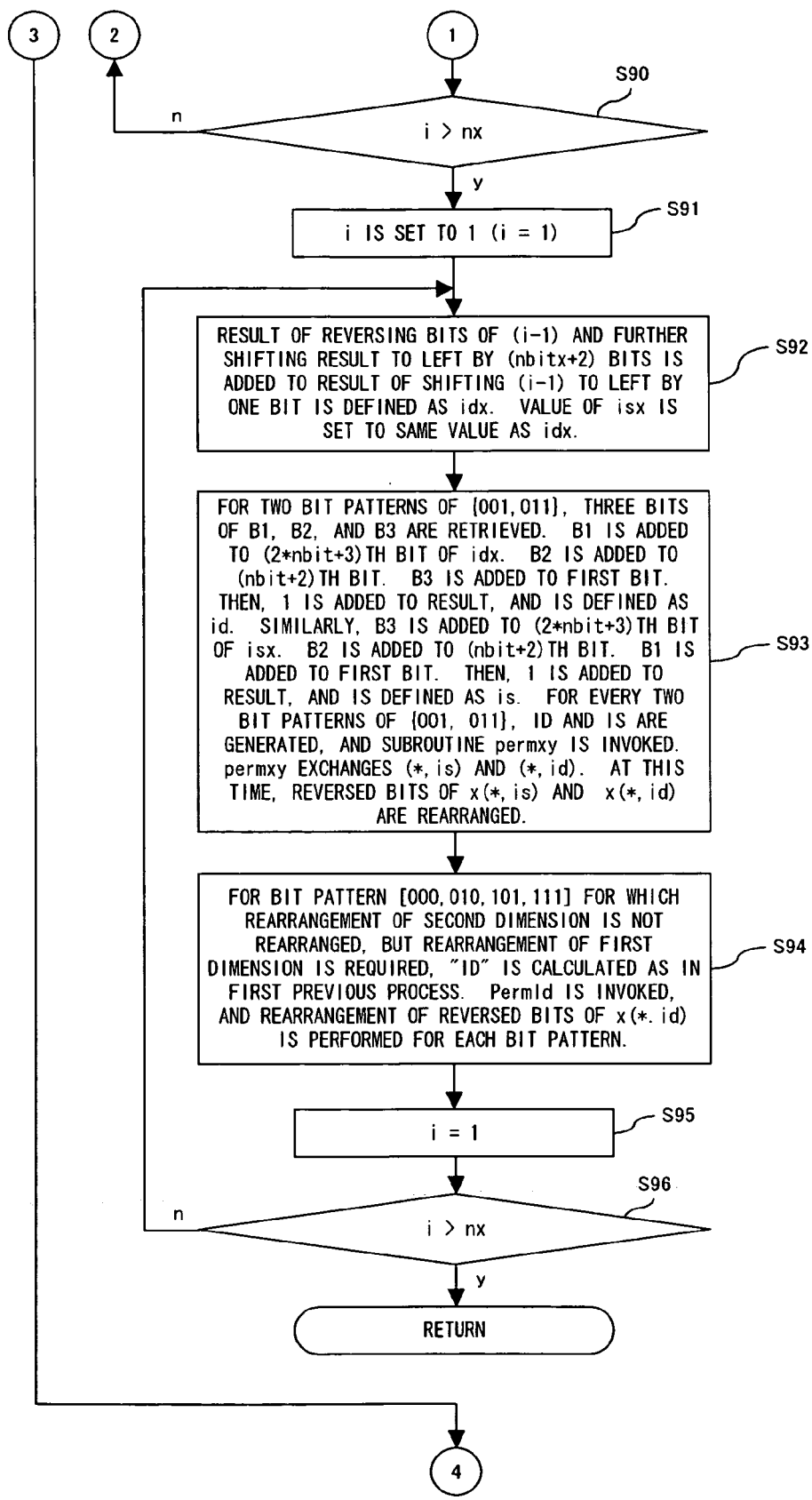
FIG. 9 is a flowchart (2) for explanation of the process of subroutine bitrb2d.
Figure 10:
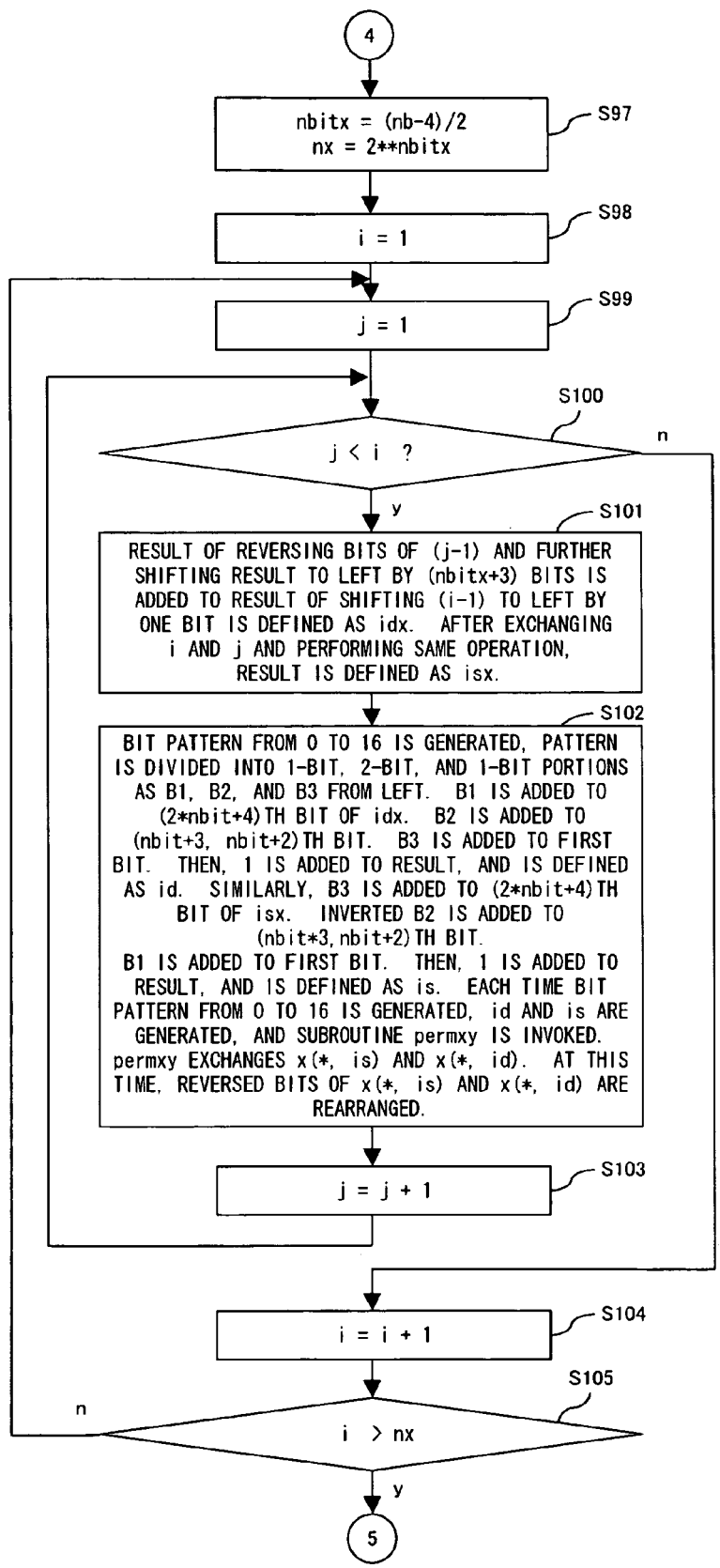
FIG. 10 is a flowchart (3) for explanation of the process of subroutine bitrb2d.
Figure 11:
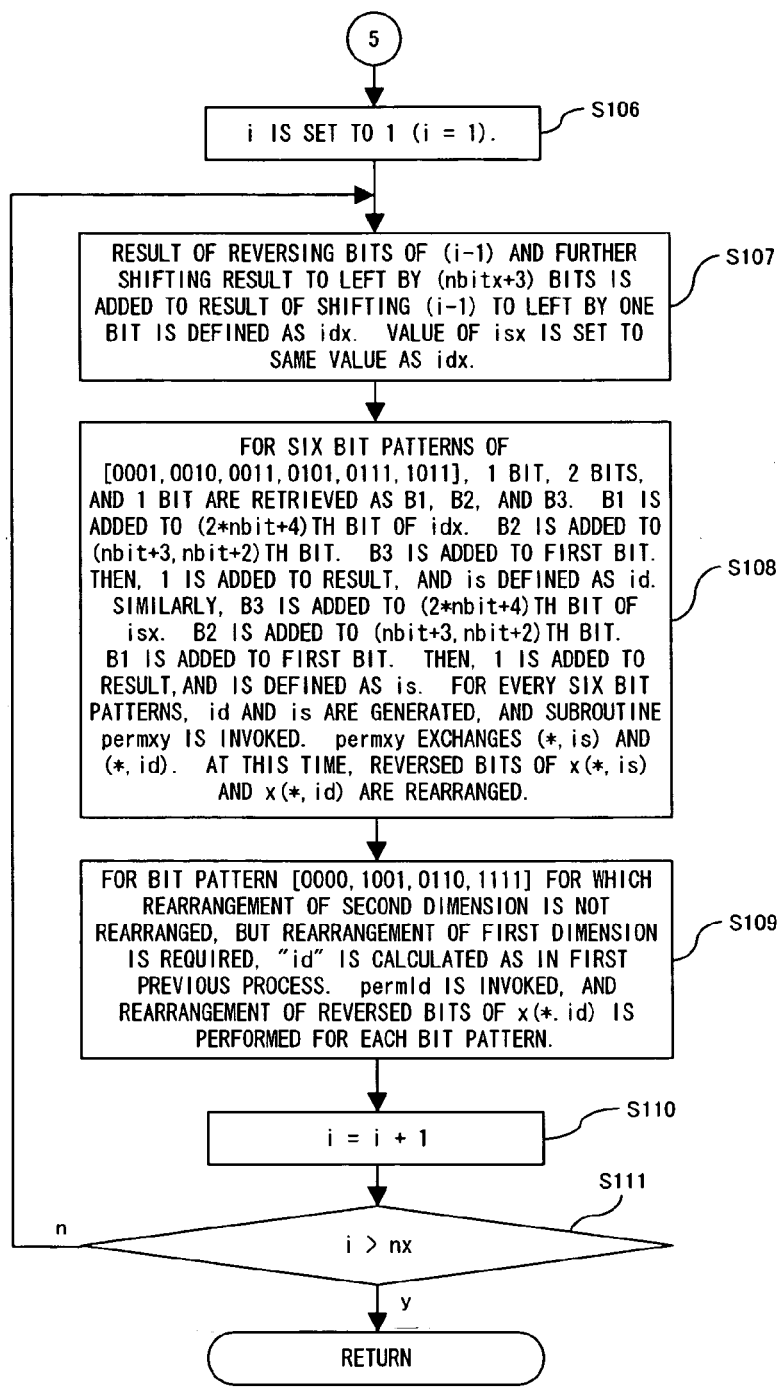
FIG. 11 is a flowchart (4) for explanation of the process of subroutine bitrb2d.
Figure 12:
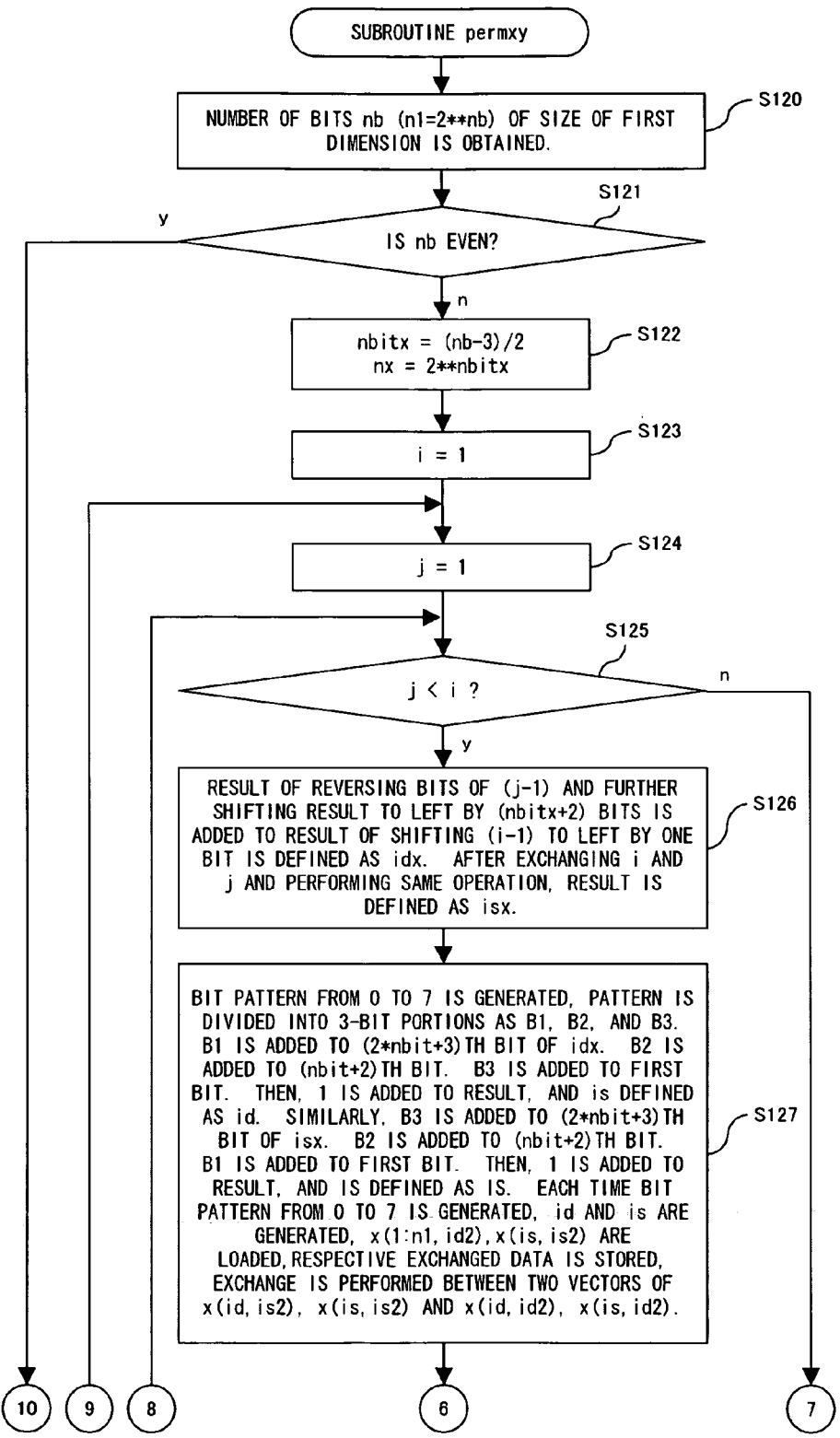
FIG. 12 is a flowchart (1) of the process of a subroutine permxy.
Figure 13:
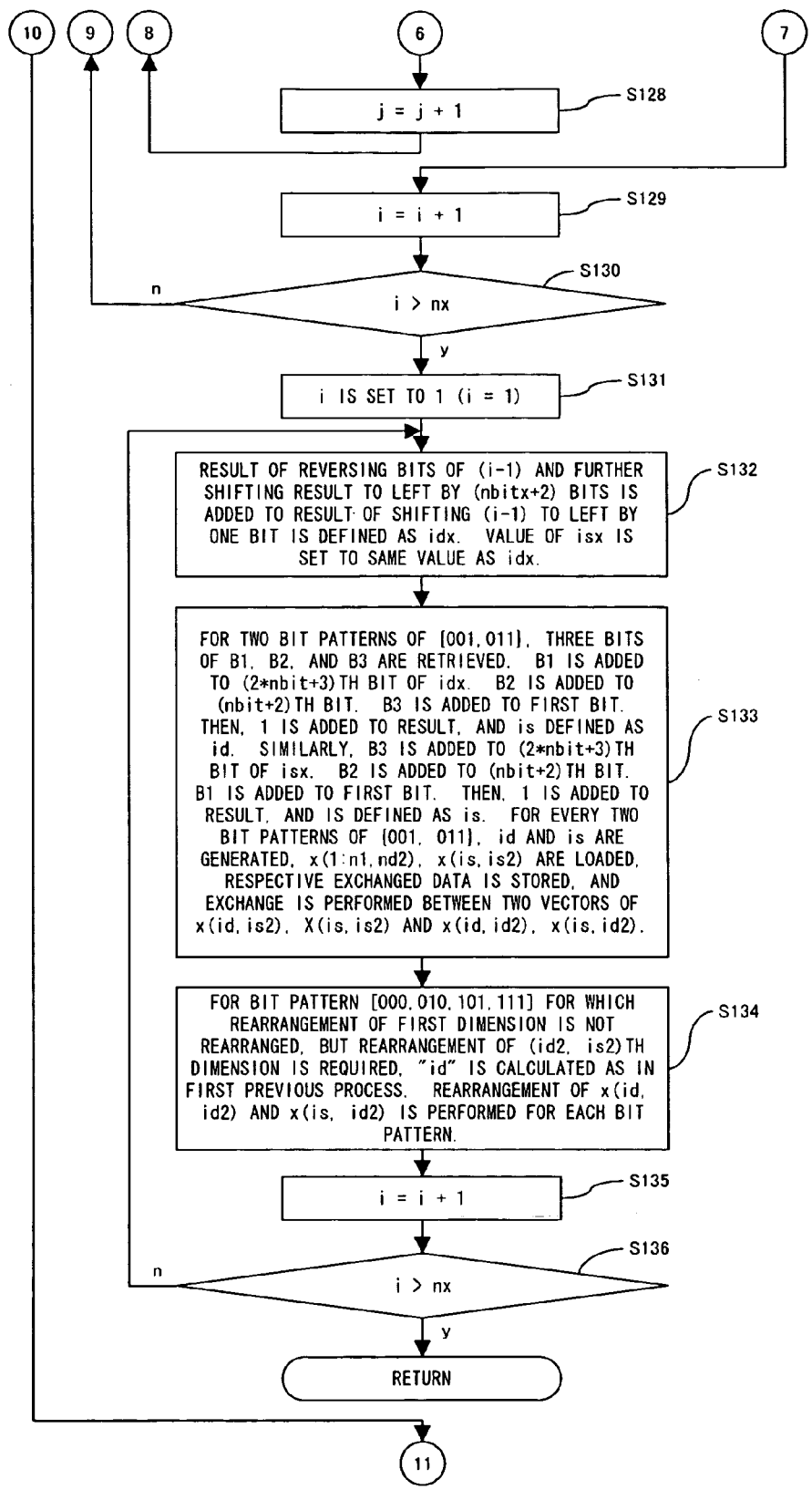
FIG. 13 is a flowchart (2) of the process of a subroutine permxy.
Figure 14:
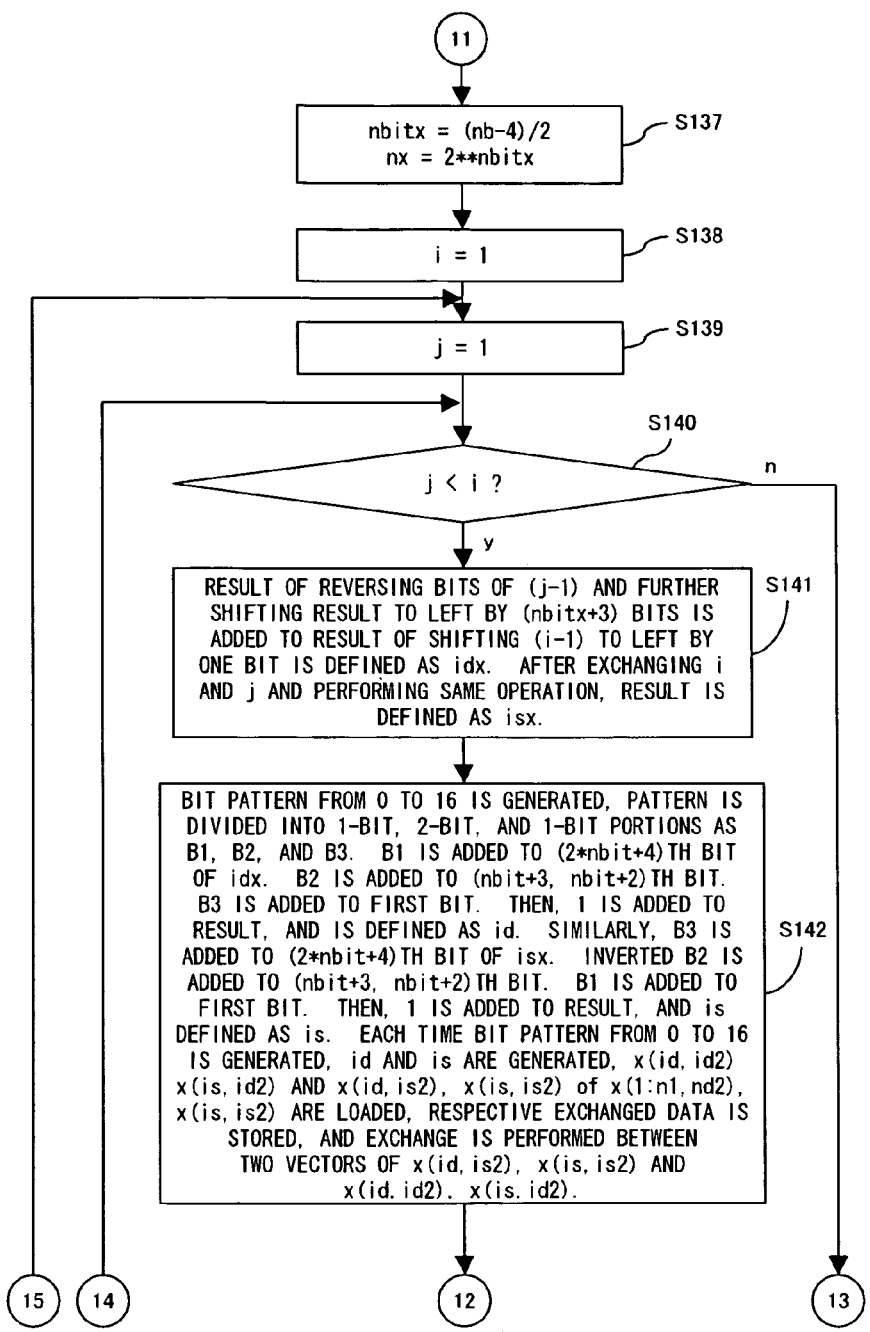
FIG. 14 is a flowchart (3) of the process of a subroutine permxy.
Figure 15:
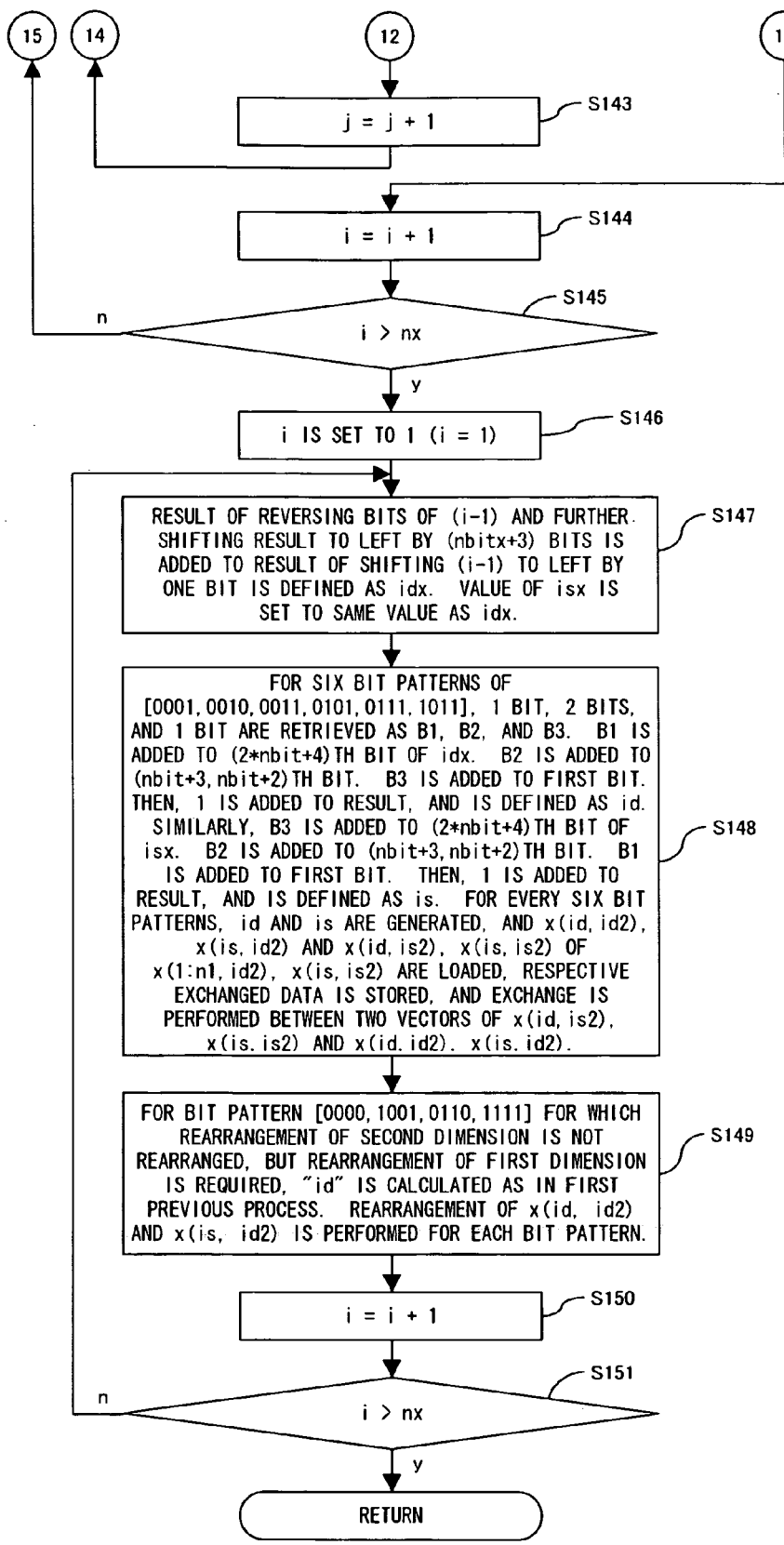
FIG. 15 is a flowchart (4) of the process of a subroutine permxy.
Figure 16:
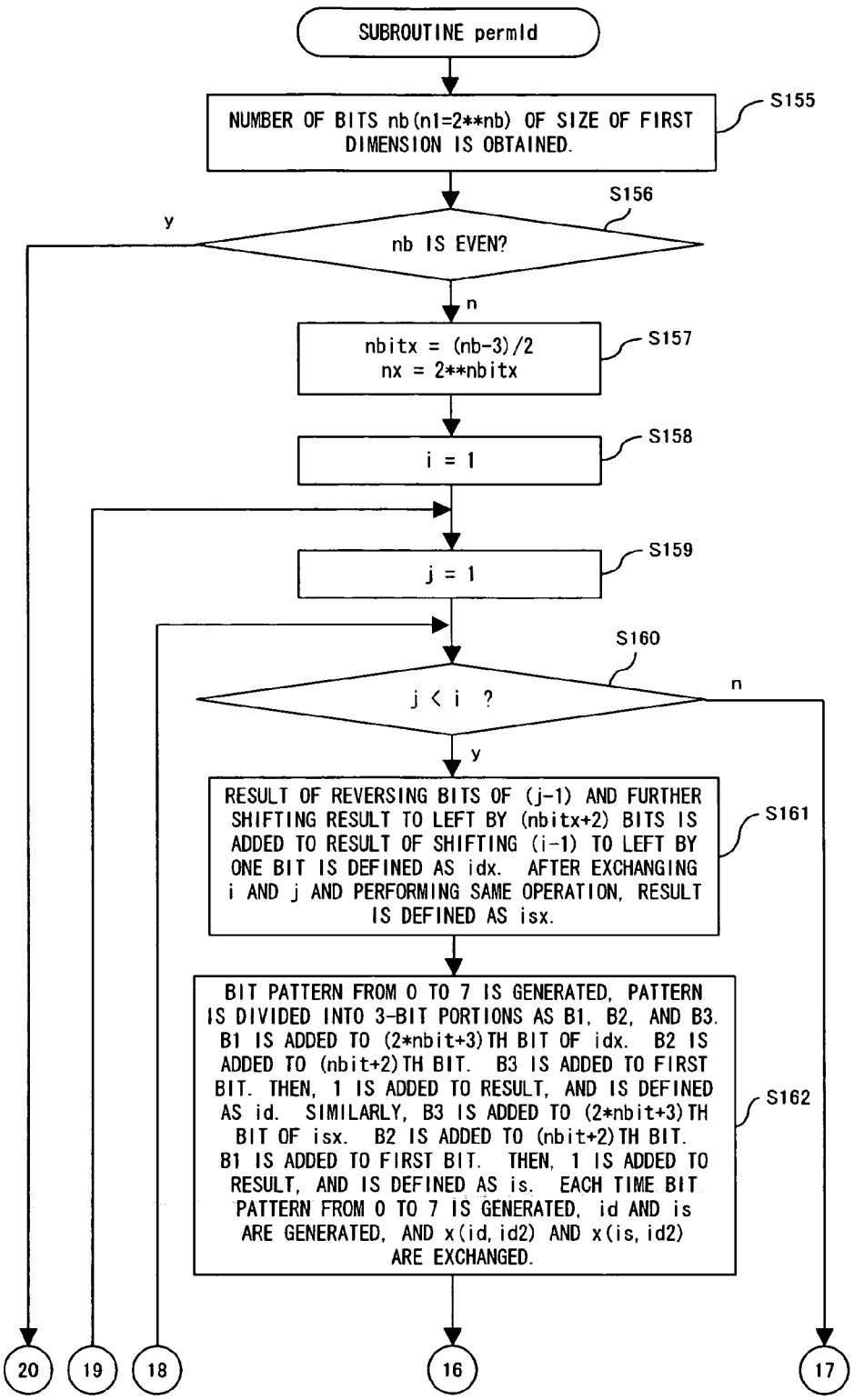
FIG. 16 is a flowchart (1) of the process of a subroutine perm1d.
Figure 17:
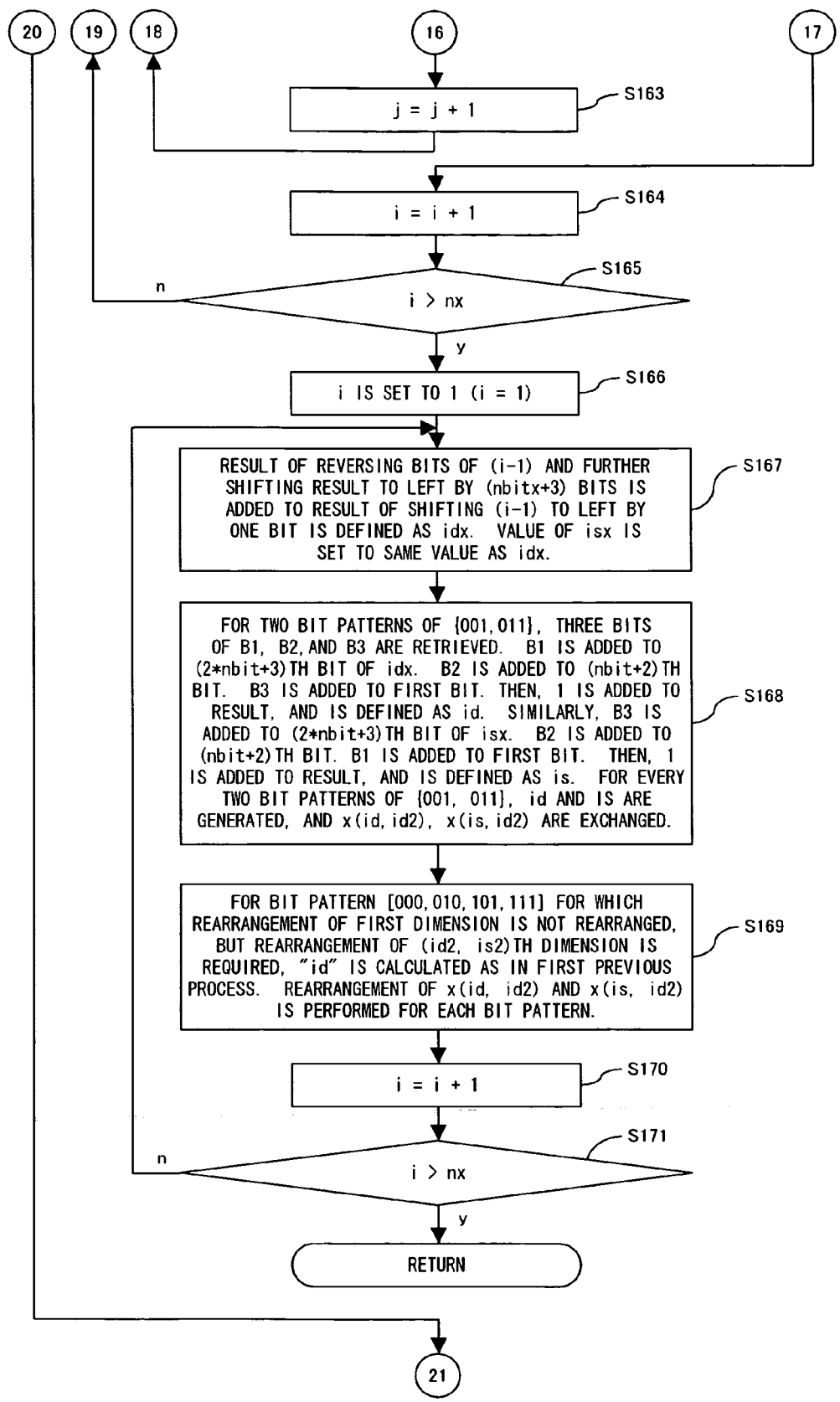
FIG. 17 is a flowchart (2) of the process of a subroutine perm1d.
Figure 18:
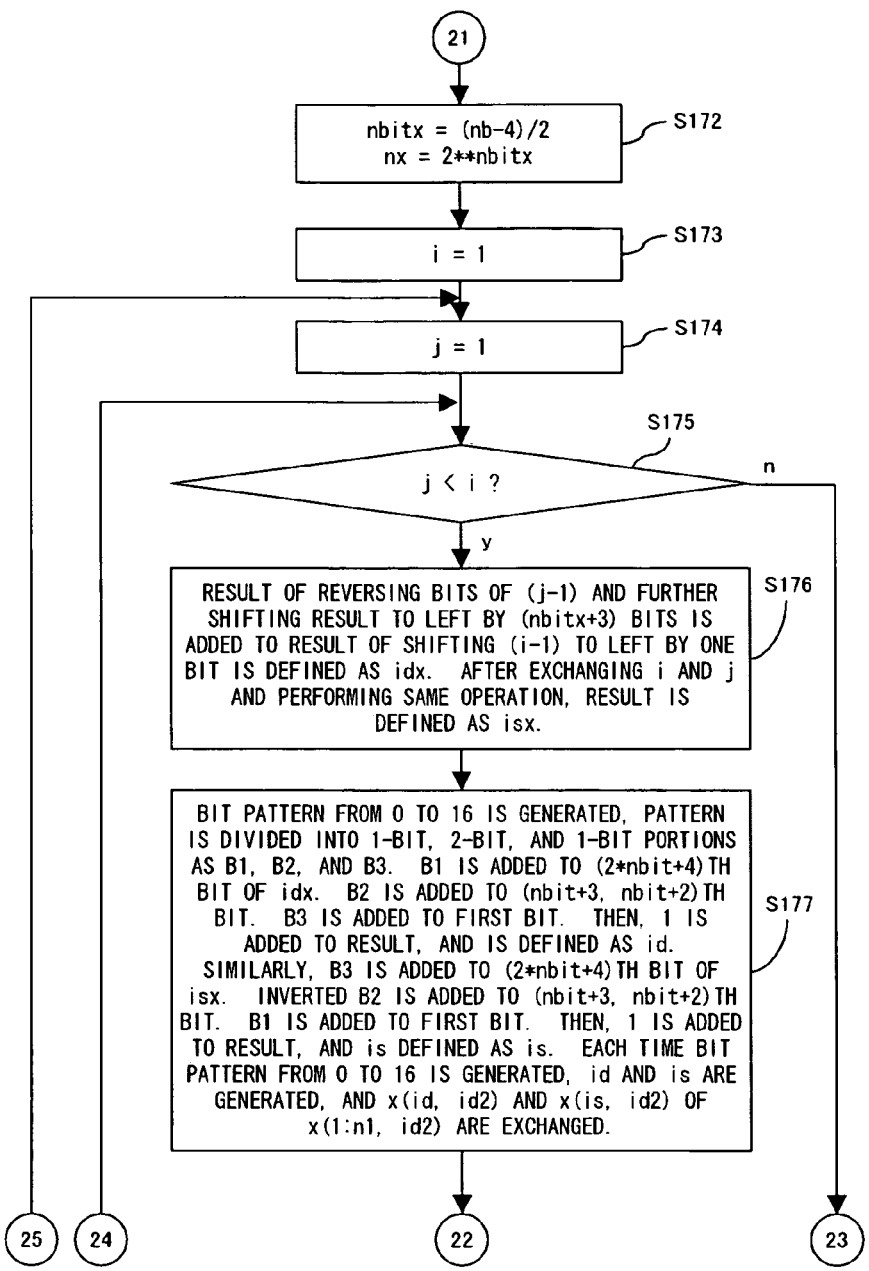
FIG. 18 is a flowchart (3) of the process of a subroutine perm1d.
Figure 19:
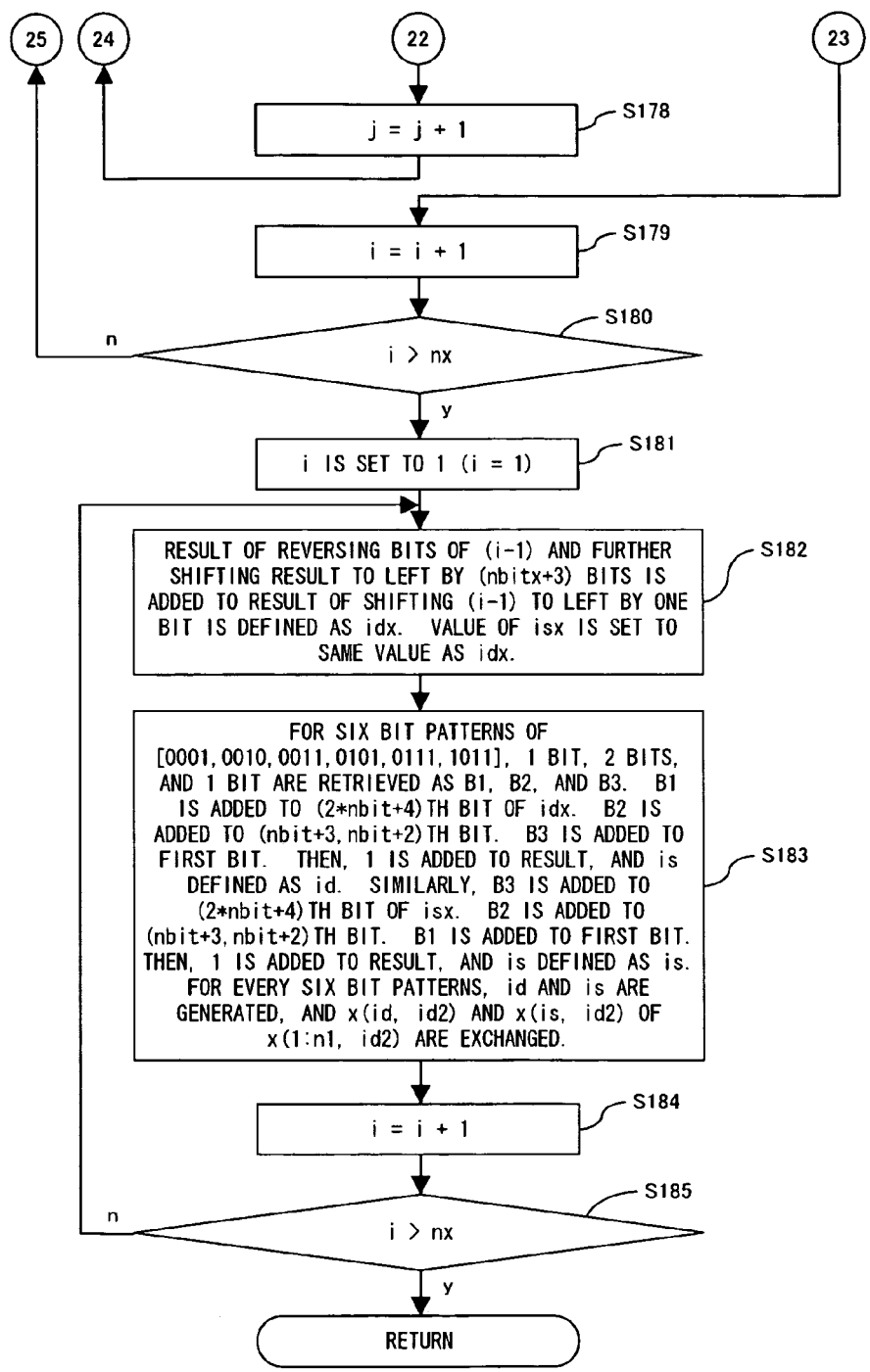
FIG. 19 is a flowchart (4) of the process of a subroutine perm1d.

FIG. 6 is a flowchart for explanation of the process of the subroutine fft2 according to an embodiment of the present invention.

In the processor having more than 128 floating point registers such as the Itanium 2, if a program is written in a high-level language such as Fortran using a scalar variable, then a code using a register is generated while there are sufficient registers. It is assumed that the variables are assigned the respective registers. When the radix is $r_x$, and the length of the data to be transformed is n, m equals $n/r_x$. The array of the input is set as $x(m, r_x)$, the output is $w(r_x, m)$. When x=1, factorization is performed into $m=r_2 \times r_3 \times \ldots \times r_p$, and the transform is completed on each radix. The number of factors is p. The number of radixes is regarded as a multidimensional array $x(r_2, r_3, \ldots, r_p, r_x)$, and W is regarded as $w(r_p, r_{p-1}, \ldots r_2, r_x)$, and the indexes other than the highest order index are rearranged in the reverse order.

In FIG. 6, in step S60, $x(1, 1:r_x)$ is loaded into tmp1, ..., tmprx, and i is set to 1. In step S61, using tmp1, ..., tmprx, the calculation for reference to them is performed, and the result is stored in the scalar variable. In step S62, immediately after the reference to tmp1, ..., tmprx, an instruction to load $x(i+1, 1:rx)$ into tmp1, ..., tmprx is issued. The load can be described by a simple substitute sentence. In step S63, the continued calculation of the Fourier transform of the remaining radix $r_x$ is performed. In step S64, assuming that $dis1=r_2, dis2=dis1*r_3\ldots, disp-1=disp-2*r_p$ $dit1=r_p, dit2=dit1*r_{p-1}\ldots, ditp-1=ditp-2*r_2$ Assuming that j←i−1, i0, ..., ip−1 is determined to satisfy $j=i0+i1*dis1+i2*dis2+\ldots+ip-1*disp-1$ That is, i0-=mod(j, dis1), i←j/dis1, ... ix=mod(j, disx+1) j←j/disx+1 is repeated. Then, the calculation is performed by $k=ip-1+ip-2*dit1+\ldots+i0*ditp-1+1$ In step S65, the result is stored in $w(1:r_x, k)$ In step S66, i is increased by 1. In step S67, it is determined whether or not i<m. If the determination in step S67 is YES, control is returned to step S61. If the determination in step S67 is NO, in step S68, using tmp1, ..., tmprx, the calculation for reference to them is performed, and the result is stored in the scalar variable. In step 69, $dis1=r_2, dis2=dis1*r_3\ldots, disp-1=disp-2*r_p$ $dit1=r_p, dit2=dit1*r_{p-1}\ldots, ditp-1=ditp-2*r_2$ Assuming that j←i−1, i0, ..., ip−1 is determined to satisfy $j=i0+i1*dis1+i2*dis2+\ldots+ip-1*disp-1$ That is, i0=mod(j, dis1), i←j/dis1, ... ix=mod(j, disx+1) j←j/disx+1 is repeated. Then, the calculation is performed by $k=ip-1+ip-1*dit1+\ldots+i0*ditp-1+1$ In step S70, the result is stored in w(1:rx, k), thereby exiting the subroutine.

FIG. 7 is a flowchart for explanation of the method of simultaneously rearranging reversed bits.

Similarly in this method, the calculation can be performed in the following four steps when the data length n is factorized as p×q. It is assumed that n can be expressed as some power of 2.

When the reversed bits are separately obtained, the following process is performed.

step 1: Assume that the storage area x has a two-dimensional array of x (p,q). The Fourier transform of the length q relating to the second dimension is performed for the multiplicity p.

step 2: The element x(i,j) of x(p,q) is multiplied by ω**(i*j) where ω=exp(−2π/n).

step 3: x(p,q) is transposed and stored in w(q.p).

step 4: On the second dimension of w, the Fourier transform of the length p is performed for the multiplicity q.

The result of the Fourier transform in steps 1 and 3 performed in the transform of the length p in step 4 for the factorization into two factors is stored in the order of the rearrangement of reversed bits, and the transposition in step 3 is not performed. As a result, the same calculation can be performed by finally rearranging the reversed bits for all data.

The following process is performed when bits are simultaneously reversed.

step 1: Assume that the storage area x has a two-dimensional array of x (p,q). The Fourier transform of the length q relating to the second dimension is performed for the multiplicity p.

step 2: The element x(i,j) of x(p,q) is multiplied by ω**(i*j) where ω=exp(−2π/n).

step 3: The result of the Fourier transform on the second dimension is stored in x (p,q) in the order of the reversed bits.

step 4: On the first dimension of x, the Fourier transform of the length p is performed for the multiplicity q. The result is stored in the order of rearranged reversed bits.

step 5: The data of x(p×q) is rearranged for the reversed bits.

By repeatedly and recursively providing steps 1 through 3, the Fourier transform of the length n can be calculated.

In FIG. 7, in step S77, the calculation in the following s1 through S11 is performed on the first dimension, and is performed for the multiplicity of the second dimension. In step S76, relating to the second dimension, the calculation in s1 through s11 is performed for the multiplicity of the first dimension on the Fourier transform on each base and the multiplication of the rotation factor. In step S77, the rearrangement of the reversed bits of the first dimension and the second dimension is simultaneously performed. In this case, the subroutine bitrb2d is invoked.

The data length n is factorized into multiplication of p radixes. $n = n_1 \times n_2 \times \ldots \times n_p$ s1: $m \leftarrow n/n_p$ s2: The one-dimensional area in which data is stored is regarded as a two-dimensional array of $x(m, n_p)$ s3: The Fourier transform of the radix $n_p$ of the second dimension is performed for the multiplicity m.

s4: $x(m, n_p)$ is multiplied by a rotation factor.

s5: The result of the Fourier transform of the radix $n_p$ is stored in the order in which the reversed bits are rearranged.

Since the radix is fixed, the Fourier transform of the radix $n_p$ is changed such that the storage position of the result can be changed.

s6: "m" is two-dimensionally factorized into $(m/n_{p-1}, n_p-1)$. Therefore, the update to $m \leftarrow m/n_{p-1}$, is performed.

s7: The data is raised by one dimension to $w(m, n_{p-1}, n_p)$, and the calculation in the following STEP 1 is applied.

STEP 1: First, the Fourier transform of $n_{p-1}$ of the second dimension is performed for the multiplicity $m \times n_p$.

s8: $x(m, n_{p-1}, *)$ is multiplied by the rotation factor.

s9: The result of the Fourier transform of the radix $n_{p-1}$ of the second dimension is stored in the order in which the reversed bits are rearranged.

s10: The m is factorized into multiplication by the next radix, thereby repeating the Fourier transform.

s11: When the Fourier transform is performed on the last radix, the result is stored in the order in which the reversed bits are rearranged.

s12: Reversed bits are rearranged on the data of x(n).

FIGS. 8 through 11 are flowcharts for explanation of the process of the subroutine bitrb2d. In step S80, the number of bits $n_b$ ($n2=2^{}n_b$) of the size of the second dimension is obtained. In step S81, it is determined whether or not $n_b$ is even. If it is determined in step S81 that it is odd, control is passed to step S97. If it is determined in step S81 that it is even, control is passed to step S82. In step S82, nbitx=(nb−3)/2, nx=2nbitx is calculated. In step S83, i is set to 1. In step S84, j is set to 1. In step S85, it is determined whether or not j<i. If the determination in step S85 is NO, control is passed to step S89. If the determination in step S85 is YES, in step S86, the result of reversing the bits of (j−1) and further shifting the result to the left by (nbitx+2) bits is added to the result of shifting (i−1) to the left by one bit is defined as idx. After exchanging i and j and performing the same operation, the result is defined as isx. In step S87, the bit pattern from 0 to 7 is generated, the pattern is divided into 3-bit portions as B1, B2, and B3. B1 is added to the (2*nbit+3) th bit of the idx. B2 is added to the (nbit+2) th bit. B3 is added to the first bit.

Then, 1 is added to the result, and is defined as id. Similarly, B3 is added to the (2*nbit+3)th bit of the isx. B2 is added to the (nbit+2) th bit. B1 is added to the first bit. Then, 1 is added to the result, and is defined as is. Each time the bit pattern from 0 to 7 is generated, id and is are generated, and the subroutine permxy is invoked. The permxy exchanges x(*, is) and x(*, id). At this time, x(*, is) and the reversed bits of x(*, id) are rearranged. In step S88, j is increased by 1, and control is returned to step S85. In step S89, i is increased by 1.

In step S90, it is determined whether or not i>$n_x$. If the determination in step 90 is NO, control is returned to step S84. If the determination in step S90 is YES, i is set to 1 in step 91. In step S92, the result of reversing the bits of (i−1) and further shifting the result to the left by (nbitx+2) bits is added to the result of shifting (i−1) to the left by one bit is defined as idx. The value of isx is set to the same value as idx. In step S93, for two bit patterns of {001,011}, three bits of B1, B2, and B3 are retrieved. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3)th bit of the isx. B2 is added to the (nbit+2) th bit. B1 is added to the first bit. Then, 1 is added to the result, and is defined as is. For every two bit patterns of {001, 011}, id and is are generated, and the subroutine permxy is invoked. The permxy exchanges (*,is) and (*,id). At this time, x(*,is) and the reversed bits of x(*,id) are rearranged. In step S94, for the bit pattern [000,010,101,111] for which the rearrangement of the second dimension is not rearranged, but the rearrangement of the first dimension is required, "id" is calculated as in the first previous process. The perm1d is invoked, and the rearrangement of the reversed bits of x(*.id) is performed for each bit pattern. In step S95, i is increased by 1, and it is determined in step S96 whether or not i>$n_x$. If the determination in step S96 is NO, control is returned to step S92. If the determination in step S96 is YES, the process exits the subroutine.

In step S97, nbitx=($n_b$−4)/2, nx=2**nbitx is calculated. In step S98, i is set to 1. In step S99, j is set to 1. In step S100, it is determined whether or not j<i. If the determination in step S100 is NO, control is passed to step S104. If the determination in step S100 is YES, in step S101, the result of reversing the bits of (j−1) and further shifting the result to the left by (nbitx+3) bits is added to the result of shifting (i−1) to the left by one bit is defined as idx. After exchanging i and j and performing the same operation, the result is defined as isx. In step S102, the bit pattern from 0 to 16 is generated, the pattern is divided into 1-bit, 2-bit, and 1-bit portions as B1, B2, and B3 from the left. B1 is added to the (2*nbit+4) th bit of the idx. B2 is added to the (nbit+3, nbit+2)th bit. B3 is added to the first bit. Then, 1 is added to the result, and is defined as id. Similarly, B3 is added to the (2*nbit+4)th bit of the isx. Inverted B2 is added to the (nbit*3,nbit+2)th bit. B1 is added to the first bit. Then, 1 is added to the result, and is defined as is. Each time the bit pattern from 0 to 16 is generated, id and is are generated, and the subroutine permxy is invoked. The permxy exchanges x(*, is) and x(*, id). At this time, the reversed bits of x(*, is) and x(*, id) are rearranged. In step S103, j is increased by 1, and control is returned to step S100. In step S104, i is increased by 1. In step S105, it is determined whether or not i>$n_x$. If the determination in step 90 is NO, control is returned to step S99. If the determination in step S105 is YES, control is passed to step S106.

In step S106, i is set to 1. In step S107, the result of reversing the bits of (i−1) and further shifting the result to the left by (nbitx+3) bits is added to the result of shifting (i−1) to the left by one bit is defined as idx. The value of isx is set to the same value as idx. In step S108, for six bit patterns of

[0001,0010,0011,0101,0111,1011], 1 bit, 2 bits, and 1 bit are retrieved as B1, B2, and B3. B1 is added to the (2*nbit+4)th bit of the idx. B2 is added to the (nbit+3,nbit+2)th bit. B3 is added to the first bit. Then, 1 is added to the result, and is defined as id. Similarly, B3 is added to the (2*nbit+4)th bit of the isx. B2 is added to the (nbit+3,nbit+2)th bit. B1 is added to the first bit. Then, 1 is added to the result, and is defined as is. For every six bit patterns, id and is are generated, and the subroutine permxy is invoked. The permxy exchanges the (*,is) and (*,id). At this time, the reversed bits of x(*,is) and x(*,id) are rearranged. In step S109, for the bit pattern [0000, 1001, 0110, 1111] for which the rearrangement of the second dimension is not rearranged, but the rearrangement of the first dimension is required, "id" is calculated as in the first previous process. The perm1d is invoked, and the rearrangement of the reversed bits of x(*.id) is performed for each bit pattern. In step S110, i is increased by 1, and it is determined in step S111 whether or not $i>n_x$. If the determination in step S96 is NO, control is returned to step S107. If the determination in step S111 is YES, the process exits the subroutine.

FIGS. 12 through 15 are flowcharts of the processes of the subroutine permxy.

The subroutine permxy receives x(1:n1,id2) and x(1:n1, is2) from the source of the invoke, rearranges the vector having the length n1 of x(1:n1,id2) and x(1:n1,is2) into the sequence of reversed bits, and the resultant first dimension vector is exchanged.

In step S120, the number of bits nb (n2=2nb) of the size of the first dimension is obtained. In step S121, it is determined whether or not nb is even. If it is determined in step S121 that it is odd, control is passed to step S137. If it is determined in step S121 that it is even, in step S122, nbitx= $(n_b-3)/2$, nx=2nbitx is calculated. In step S123, i is set to 1. In step S124, j is set to 1. In step S125, it is determined whether or not j<i. If the determination in step S125 is NO, control is passed to step S129. If the determination in step S125 is YES, in step S126, the result of reversing the bits of (j−1) and further shifting the result to the left by (nbitx+2) bits is added to the result of shifting (i−1) to the left by one bit is defined as idx. After exchanging i and j and performing the same operation, the result is defined as isx. In step S127, the bit pattern from 0 to 7 is generated, the pattern is divided into 3-bit portions as B1, B2, and B3. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3)th bit of the isx. B2 is added to the (nbit+2) th bit. B1 is added to the first bit. Then, 1 is added to the result, and is defined as is. Each time the bit pattern from 0 to 7 is generated, id and is are generated, x(id,id2) and x(is,id2), x(id,is2) and x(is,is2) of x(1:n1,id2) and x(1:n1, is2) are loaded, the respective exchanged data is stored, the exchange is performed between two vectors of x(id,is2), x(is,is2) and x(id,id2), x(is,id2). In step S128, j is increased by 1, and control is returned to step S125.

In step S129, i is increased by 1. In step S130, it is determined whether or not $i>n_x$. In step S131, i is set to 1. In step S132, the result of reversing the bits of (i−1) and further shifting the result to the left by (nbitx+2) bits is added to the result of shifting (i−1) to the left by one bit is defined as idx. The value of isx is set to the same value as idx. In step S133, for two bit patterns of {001,011}, three bits of B1, B2, and B3 are retrieved. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3) th bit of the isx. B2 is added to the (nbit+2)th bit. B1 is added to the first bit. Then, 1 is added to the result, and is defined as is. For every two bit patterns of {001, 011}, id and is are generated, x(id,id2), x(is,id2) and x(id,is2), x(is,is2) of x(1:n1,id2) and x(1:n1,is2) are loaded, the respective exchanged data is stored, and the exchange is performed between two vectors of x (id,is2), x (is,is2) and x (id,id2), x (is,id2). In step S134, for the bit pattern [000,010, 101,111] for which the rearrangement of the first dimension is not rearranged, but the rearrangement of the (id2, is2)th dimension is required, "id" is calculated as in the first previous process. The rearrangement of the (id. id2) and (id, is2) is performed for each bit pattern. In step S135, i is increased by 1, and it is determined in step S136 whether or not $i>n_x$. If the determination in step S136 is NO, control is returned to step S132. If the determination in step S136 is YES, the process exits the subroutine.

In step S137, nbitx=(nb-3)/2, nx=2**nbitx is calculated. In step S138, i is set to 1. In step S139, j is set to 1. In step S140, it is determined whether or not j<i. If the determination in step S140 is NO, control is passed to step S144. If the determination in step S140 is YES, in step S141, the result of reversing the bits of (j−1) and further shifting the result to the left by (nbitx+3) bits is added to the result of shifting (i−1) to the left by one bit is defined as idx. After exchanging i and j and performing the same operation, the result is defined as isx. In step S142, the bit pattern from 0 to 16 is generated, the pattern is divided into 1-bit, 2-bit, and 1-bit portions as B1, B2, and B3. B1 is added to the (2*nbit+4)th bit of the idx. B2 is added to the (nbit+3, nbit+2)th bit. B3 is added to the first bit. Then, 1 is added to the result, and is defined as id. Similarly, B3 is added to the (2*nbit+4)th bit of the isx. Inverted B2 is added to the (jit+3, nbit+2)th bit. B1 is added to the first bit. Then, 1 is added to the result, and is defined as is. Each time the bit pattern from 0 to 16 is generated, id and is are generated, x(id,id2), x(is,id2) and x(id,is2), x(is,is2) of x(1:n1,id2) and x(1:n1,is2) are loaded, the respective exchanged data is stored, and the exchange is performed between two vectors of x(id,is2), x(is,is2) and x(id,id2), x(is,id2). In step S143, j is increased by 1. In step S144, i is increased by 1. In step S145, it is determined whether or not $i>n_x$. If the determination in step S145 is NO, control is returned to step S139. If the determination in step S145 is YES, i is set to 1 in step S146. In step S147, the result of reversing the bits of (i−1) and further shifting the result to the left by (nbitx+3) bits is added to the result of shifting (i−1) to the left by one bit is defined as idx. The value of isx is set to the same value as idx. In step S148, for six bit patterns of [0001,0010,0011,0101,0111,1011], 1 bit, 2 bits, and 1 bit are retrieved as B1, B2, and B3. B1 is added to the (2*nbit+4)th bit of the idx. B2 is added to the (nbit+3,nbit+2)th bit. B3 is added to the first bit. Then, 1 is added to the result, and is defined as id. Similarly, B3 is added to the (2*nbit+4)th bit of the isx. B2 is added to the (nbit+3, nbit+2)th bit. B1 is added to the first bit. Then, 1 is added to the result, and is defined as is. For every six bit patterns, id and is are generated, and x(id,id2), x(is,id2) and x(id,is2), x(is, is2) of x(1:n1,id2) and x(1:n1,is2) are loaded, the respective exchanged data is stored, and the exchange is performed between two vectors of x(id,is2), x(is,is2) and x(id,id2), x(is, id2). In step S149, for the bit pattern [0000,1001,0110,1111] for which the rearrangement of the second dimension is not rearranged, but the rearrangement of the first dimension is required, "id" is calculated as in the first previous process. The rearrangement of the x(id. id2) and (id, is2) is performed for each bit pattern. In step S150, i is increased by 1, and it is determined in step S151 whether or not $i>n_x$. If the determination in step S151 is NO, control is returned to step S147. If the determination in step S151 is YES, the process exits the subroutine.

FIGS. 16 through 19 are flowcharts of the processes of the subroutine perm1d.

The subroutine perm1d receives x(1:n1,id2) from the source of the invoke, rearranges the vector having the length n1 of x(1:n1,id2) into the sequence of reversed bits.

In step S155, the number of bits nb (n2=$2^{}$nb) of the size of the first dimension is obtained. In step S156, it is determined whether or not nb is even. If the determination in step S156 is YES, control is passed to step S172. If the determination in step S156 is NO, in step S157, nbitx=$(n_b-3)/2$, nx=$2^{}$nbitx is calculated. In step S158, i is set to 1. In step S159, j is set to 1. In step S160, it is determined whether or not j<i. If the determination in step S160 is NO, control is passed to step S164. If the determination in step S160 is YES, in step S161, the result of reversing the bits of (j−1) and further shifting the result to the left by (nbitx+2) bits is added to the result of shifting (i−1) to the left by one bit is defined as idx. After exchanging i and j and performing the same operation, the result is defined as isx. In step S162, the bit pattern from 0 to 7 is generated, the pattern is divided into 3-bit portions as B1, B2, and B3. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3)th bit of the isx. B2 is added to the (nbit+2)th bit. B1 is added to the first bit. Then, 1 is added to the result, and is defined as is. Each time the bit pattern from 0 to 7 is generated, id and is are generated, and x(1:n1,id2) and x(id,id2) are exchanged. In step S163, j is increased by 1. In step S164, i is increased by 1. In step S165, it is determined whether or not i>$n_x$. If the determination in step S165 is NO, control is returned to step S159. If the determination in step S165 is YES, i is set to 1 in step S166. In step S167, the result of reversing the bits of (i−1) and further shifting the result to the left by (nbitx+3) bits is added to the result of shifting (i−1) to the left by one bit is defined as idx. The value of isx is set to the same value as idx. In step S168, for two bit patterns of {001,011}, three bits of B1, B2, and B3 are retrieved. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3)th bit of the isx. B2 is added to the (nbit+2)th bit. B1 is added to the first bit. Then, 1 is added to the result, and is defined as is. For every two bit patterns of {001, 011}, id and is are generated, and x(id,id2), x(is,id2) are exchanged. In step S169, for the bit pattern [000,010,101,111] for which the rearrangement of the first dimension is not rearranged, but the rearrangement of the (id2, is2)th dimension is required, "id" is calculated as in the first previous process. The rearrangement of the (id. id2) and (id, is2) is performed for each bit pattern. In step S170, i is increased by 1, and it is determined in step S171 whether or not i >nx. If the determination in step S171 is NO, control is returned to step S167. If the determination in step S171 is YES, the process exits the subroutine.

In step S172, nbitx=$(n_b-4)/2$, nx=$2^{**}$nbitx is calculated. In step S173, i is set to 1. In step S174, j is set to 1. In step S175, it is determined whether or not j<i. If the determination in step S175 is NO, control is passed to step S179. If the determination in step S175 is YES, in step S176, the result of reversing the bits of (j−1) and further shifting the result to the left by (nbitx+3) bits is added to the result of shifting (i−1) to the left by one bit is defined as idx. After exchanging i and j and performing the same operation, the result is defined as isx. In step S177, the bit pattern from 0 to 16 is generated, the pattern is divided into 1-bit, 2-bit, and 1-bit portions as B1, B2, and B3. B1 is added to the (2*nbit+4)th bit of the idx. B2 is added to the (nbit+3, nbit+2)th bit. B3 is added to the first bit. Then, 1 is added to the result, and is defined as id. Similarly, B3 is added to the (2*nbit+4)th bit of the isx. Inverted B2 is added to the (jit+3, nbit+2)th bit. B1 is added to the first bit. Then, 1 is added to the result, and is defined as is. Each time the bit pattern from 0 to 16 is generated, id and is are generated, and x(id, id2) and x(is, id2) of x(1:n1, id2) are exchanged. In step S178, j is increased by 1, and control is returned to step S175.

In step S179, i is increased by 1. In step S180, it is determined whether or not i>$n_x$. If the determination in step S180 is NO, control is returned to step S174. If the determination in step S180 is YES, in step S181, i is set to 1. In step S182, the result of reversing the bits of (i−1) and further shifting the result to the left by (nbitx+3) bits is added to the result of shifting (i−1) to the left by one bit is defined as idx. The value of isx is set to the same value as idx. In step S183, for six bit patterns of [0001,0010,0011,0101,0111,1011], 1 bit, 2 bits, and 1 bit are retrieved as B1, B2, and B3. B1 is added to the (2*nbit+4)th bit of the idx. B2 is added to the (nbit+3,nbit+2)th bit. B3 is added to the first bit. Then, 1 is added to the result, and is defined as id. Similarly, B3 is added to the (2*nbit+4)th bit of the isx. B2 is added to the (nbit+3,nbit+2)th bit. B1 is added to the first bit. Then, 1 is added to the result, and is defined as is. For every six bit patterns, id and is are generated, and x(id, id2) and x(is, id2) of x(1:n1, id2) are exchanged. In step S184, i is increased by 1. In step S185, and it is determined in step S185 whether or not i>$n_x$. If the determination in step S185 is NO, control is returned to step S182. If the determination in step S185 is YES, the process exits the subroutine.

Figure 20:
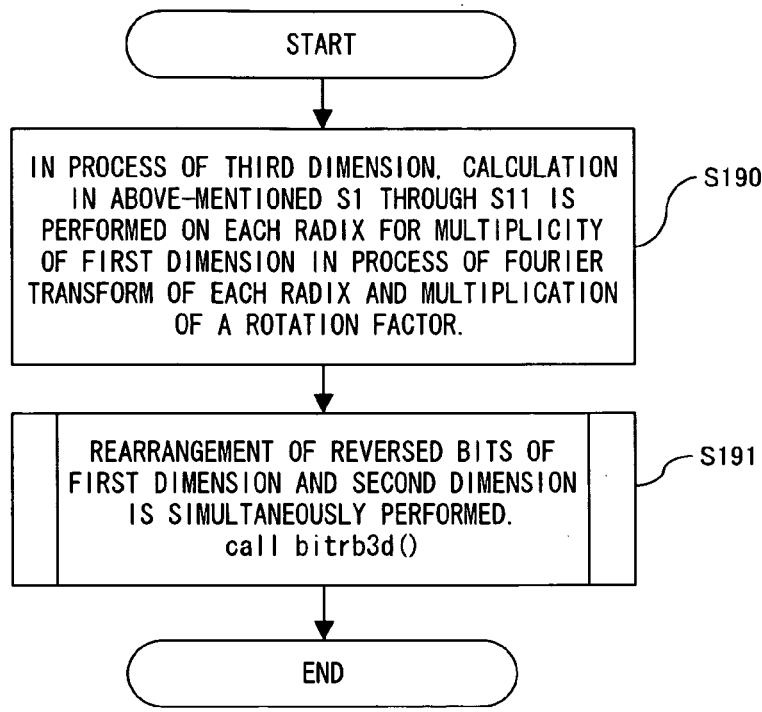
FIG. 20 is a flowchart of the process of the Fourier transform of the third dimension.
Figure 21:
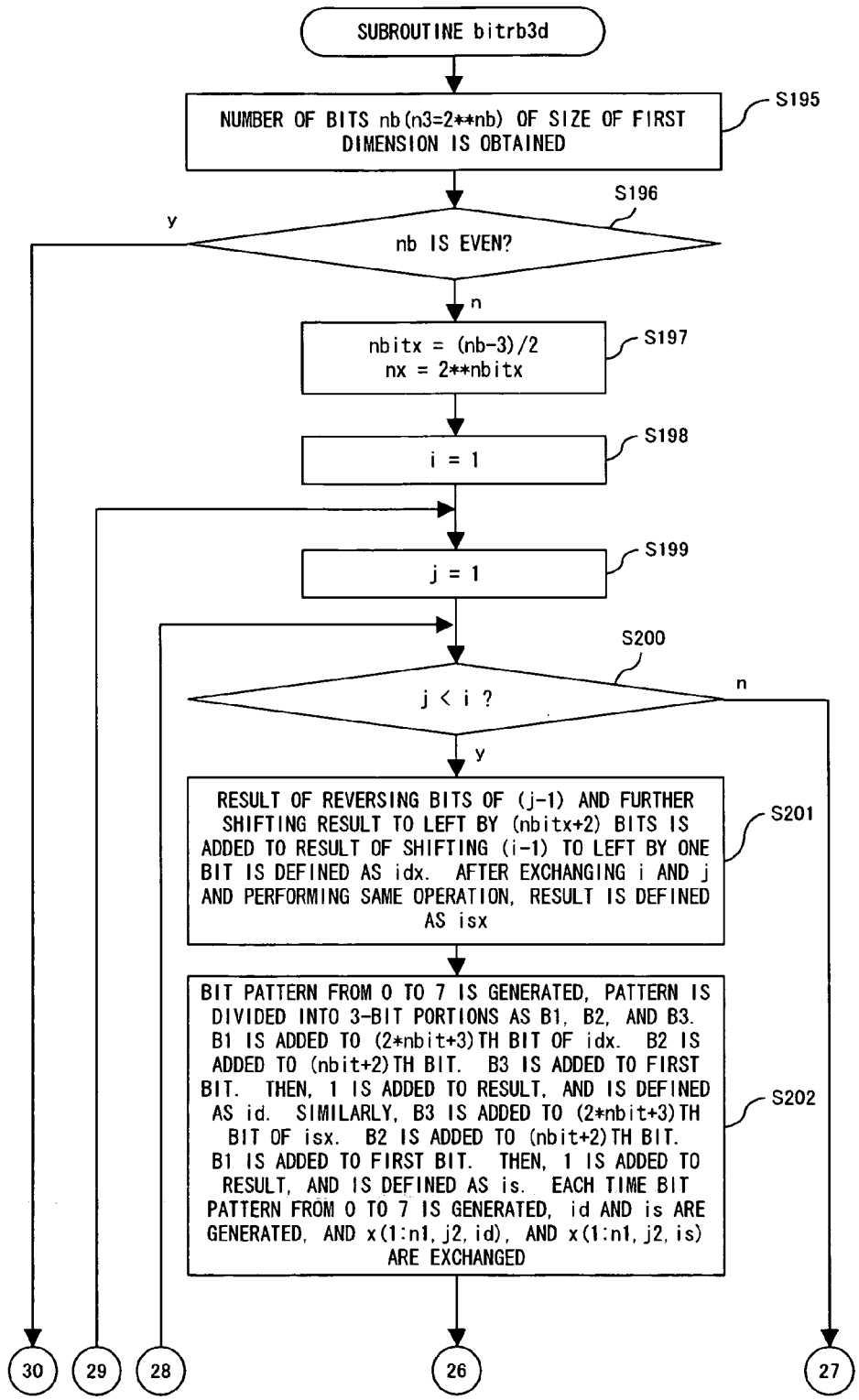
FIG. 21 is a flowchart (1) for explanation of the process of subroutine bitrb3d.
Figure 22:
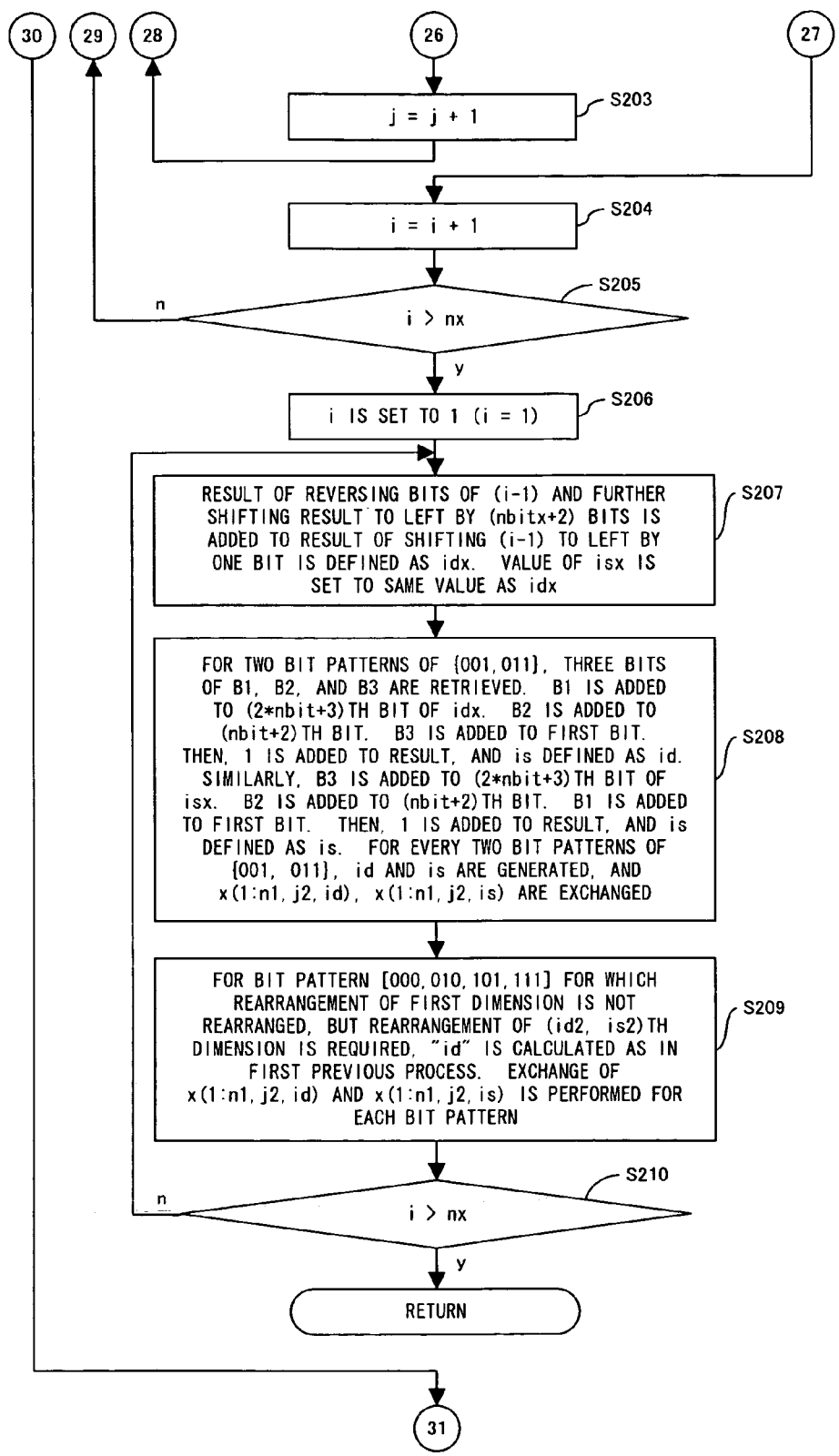
FIG. 22 is a flowchart (2) for explanation of the process of subroutine bitrb3d.
Figure 23:
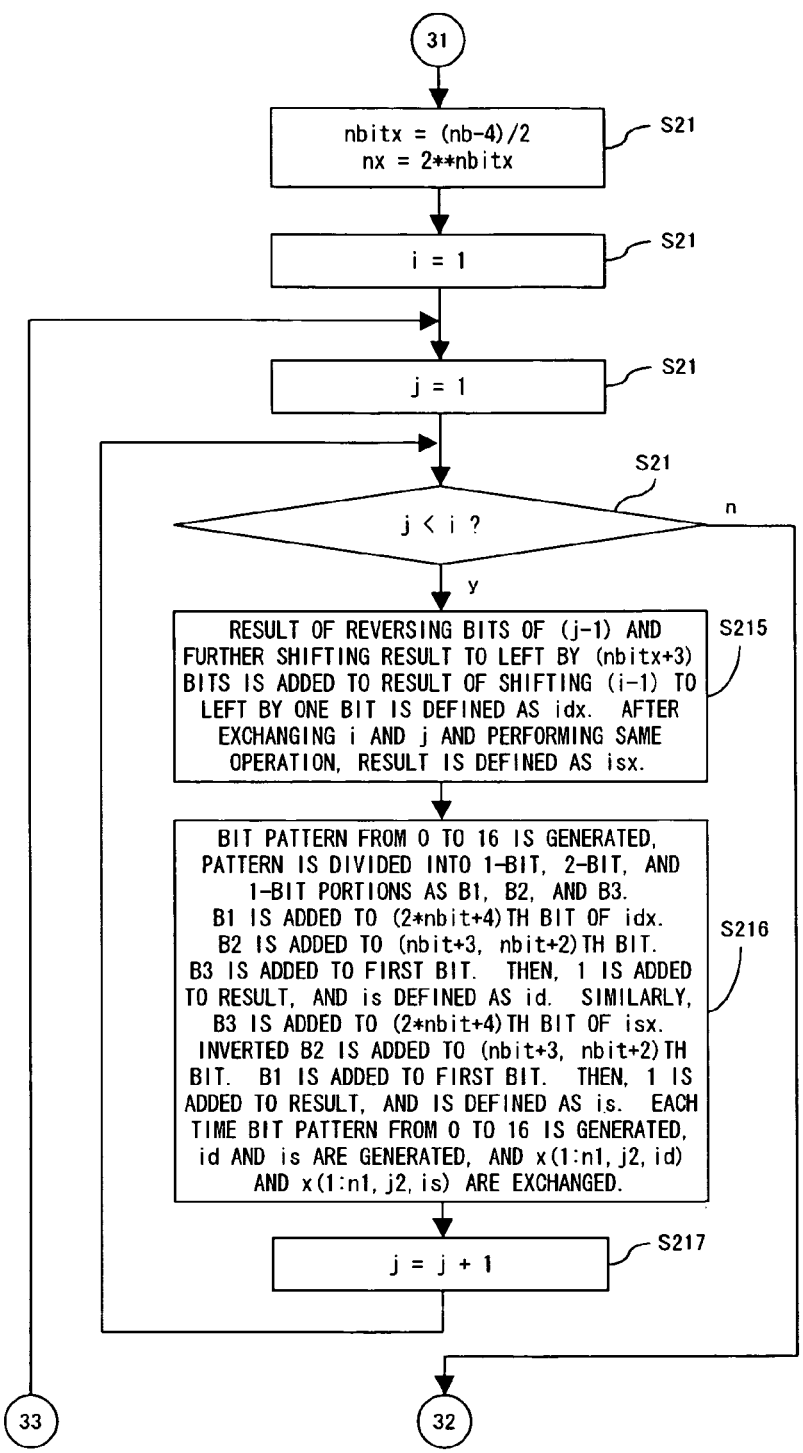
FIG. 23 is a flowchart (3) for explanation of the process of subroutine bitrb3d.
Figure 24:
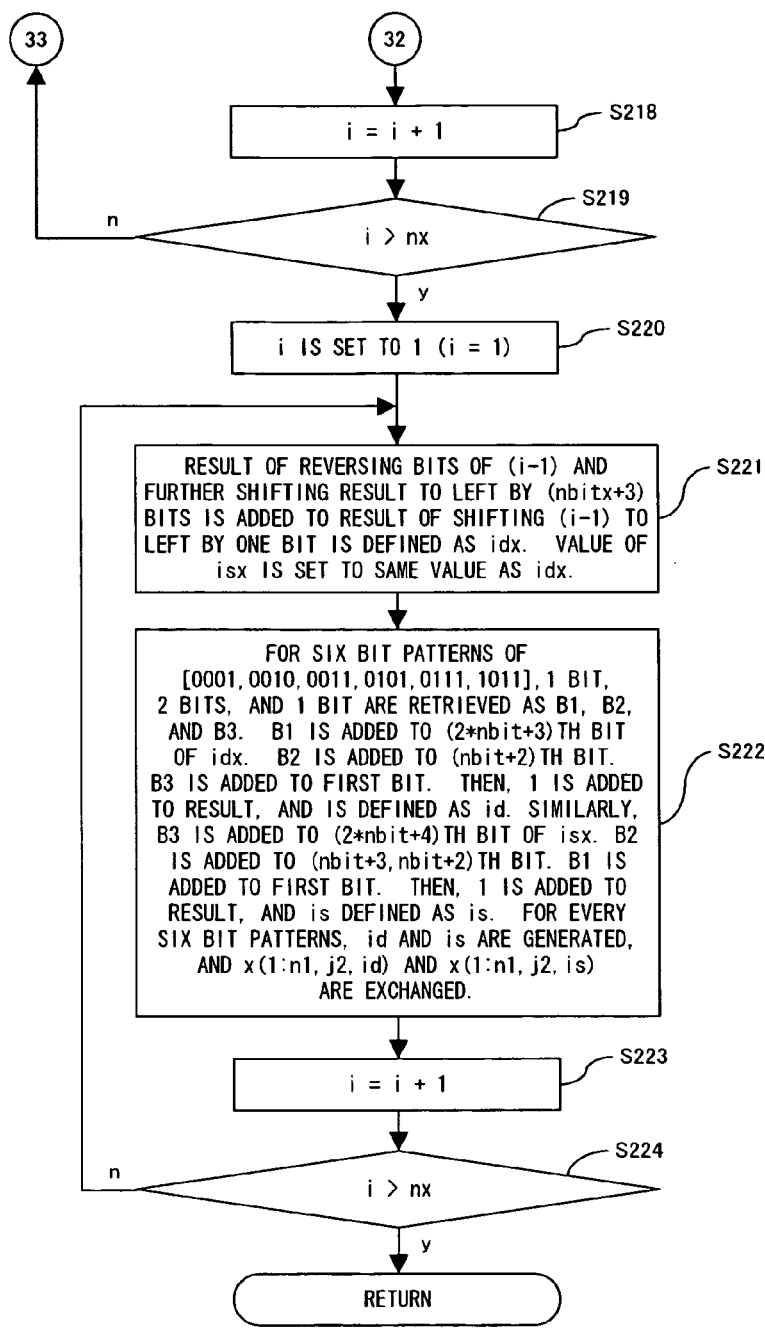
FIG. 24 is a flowchart (4) for explanation of the process of subroutine bitrb3d.

FIG. 20 is a flowchart of the Fourier transform process of the third dimension.

Relating to the x(1:n1,j2,1:3n), the Fourier transform of the third dimension is performed for the one-dimensional multiplicity.

In step S190, in the process of the third dimension, the calculation in the above-mentioned s1 through S11 is performed on each radix for the multiplicity of the first dimension in the process of the Fourier transform of each radix and a multiplication of a rotation factor. In step S191, the rearrangement of the reversed bits of the first dimension and the second dimension is simultaneously performed. In this case, the subroutine bitrb3d is invoked.

FIGS. 21 through 24 are flowcharts explaining the process of the subroutine bitrb3d.

The subroutine bitrb3d rearranges reversed bits of the third dimension in units of one-dimensional vector in the plane composed of the first dimension and the third dimension of x(1:n1, j2, 1:n3).

In FIG. 195, the number of bits nb (n2=$2^{}$nb) of the size of the first dimension is obtained. In step S196, it is determined whether or not nb is even. If the determination in step S196 is YES, control is passed to step S211. If the determination in step S196 is NO, control is passed to step aS197. In step S197, nbitx=$(n_b-3)/2$, nx=$2^{}$nbitx is calculated. In step S198, i is set to 1. In step S199, j is set to 1. In step S200, it is determined whether or not j<i. If the determination in step S200 is NO, control is passed to step S204. If the determination in step S200 is YES, in step S201, the result of reversing the bits of (j−1) and further shifting the result to the left by (nbitx+2) bits is added to the result of shifting (i−1) to the left by one bit is defined as idx. After exchanging i and j and performing the same operation, the result is defined as isx. In step S202, the bit pattern from 0 to 7 is generated, the pattern is divided into 3-bit portions as B1, B2, and B3. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3)th bit of the isx. B2 is added to the (nbit+2)th bit. B1 is added to the first bit. Then, 1 is added to the result, and is defined as is. Each time the bit pattern from 0 to 7 is generated, id and is are generated, and x(1:n1,j2,id), and x(1:n1,j2,is) are exchanged. In step S203, j is increased by 1 and control is returned to step S200.

In step S204, i is increased by 1. In step S205, it is determined whether or not i>$n_x$. If the determination in step S205 is NO, control is returned to step S199. If the determination in step S205 is YES, i is set to 1 in step S206. In step S207, the result of reversing the bits of (i-l) and further shifting the result to the left by (nbitx+2) bits is added to the result of shifting (i−1) to the left by one bit is defined as idx. The value of isx is set to the same value as idx. In step S208, for two bit patterns of {001,011}, three bits of B1, B2, and B3 are retrieved. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+3)th bit of the isx. B2 is added to the (nbit+2) th bit. B1 is added to the first bit. Then, 1 is added to the result, and is defined as is. For every two bit patterns of {001, 011}, id and is are generated, and x(1:n1,j2,id), x(1:n1, j2,is) are exchanged. In step S209, for the bit pattern [000, 010,101,111] for which the rearrangement of the first dimension is not rearranged, but the rearrangement of the (id2, is2)th dimension is required, "id" is calculated as in the first previous process. The exchange of x(1:n1,j2,id) and x(1:n1, j2,is) is performed for each bit pattern. In step S210, it is determined whether or not i>$n_x$. If the determination in step S210 is NO, control is returned to step S207. If the determination in step S210 is YES, control is passed to step S211.

In step S211, nbitx=($n_b$−4)/2, nx=2**nbitx is calculated. In step S212, i is increased by 1. In step S213, j is increased by 1. In step S214, it is determined whether or not j<i. If the determination in step S214 is NO, control is passed to step S218. If the determination in step S214 is YES, in step S215, the result of reversing the bits of (j−1) and further shifting the result to the left by (nbitx+3) bits is added to the result of shifting (i−1) to the left by one bit is defined as idx. After exchanging i and j and performing the same operation, the result is defined as isx. In step S216, the bit pattern from 0 to 16 is generated, the pattern is divided into 1-bit, 2-bit, and 1-bit portions as B1, B2, and B3. B1 is added to the (2*nbit+ 4)th bit of the idx. B2 is added to the (nbit+3, nbit+2)th bit. B3 is added to the first bit. Then, 1 is added to the result, and is defined as id. Similarly, B3 is added to the (2*nbit+4)th bit of the isx. Inverted B2 is added to the (nbit+3, nbit+2) th bit. B1 is added to the first bit. Then, 1 is added to the result, and is defined as is. Each time the bit pattern from 0 to 16 is generated, id and is are generated, and x(1:n1,j2,id) and x(1:n1,j2, is) are exchanged. In step S217, j is increased by 1, and control is returned to step S214.

In step S218, i is increased by 1. In step S219, it is determined whether or not i>$n_x$. If the determination in step S219 is NO, control is returned to step S213. If the determination in step S219 is YES, control is passed to step S220. In step S220, i is set to 1. In step S221, the result of reversing the bits of (i−1) and further shifting the result to the left by (nbitx+3) bits is added to the result of shifting (i−1) to the left by one bit is defined as idx. The value of isx is set to the same value as idx. In step S222, for six bit patterns of [0001,0010,0011,0101, 0111,1011], 1 bit, 2 bits, and 1 bit are retrieved as B1, B2, and B3. B1 is added to the (2*nbit+3)th bit of the idx. B2 is added to the (nbit+2)th bit. B3 is added to the first bit. Then, 1 is added to the result, and is defined as id. Similarly, B3 is added to the (2*nbit+4)th bit of the isx. B2 is added to the (nbit+3, nbit+2)th bit. B1 is added to the first bit. Then, 1 is added to the result, and is defined as is. For every six bit patterns, id and is are generated, and x(1:n1,j2,id) and x(1:n1,j2,is) are exchanged. In step S223, i is increased by 1. In step S224, it is determined whether or not i>$n_x$. If the determination in step S224 is NO, control is returned to step S221. If the determination in step S224 is YES, the process exits the subroutine.

What is claimed is:

1. A three-dimensional Fourier transform processing method for use with a shared memory scalar parallel computer which stores, in a continuous area, data in a direction in which i of input data x (i, j, k) is continuously arranged where an index of a first dimension is i, an index of a second dimension is j, and an index of a third dimension is k in high-speed access to the continuous data area, comprising:
   loading into a cache each unit of a two-dimensional array data x (i, j, k*) having the indexes i and j and having a value $\geqq 0$ as the index k*;
   performing a Fourier transform of the first dimension in a direction in which the index i changes for a multiplicity in the j direction with the i continuously changed based upon a j-radix;
   performing a Fourier transform of the second dimension in a direction in which the index j changes for a multiplicity in the i direction while prioritizing an arithmetic operation in a direction in which the i continuously changes based upon an i-radix;
   performing a Fourier transform of the third dimension in a direction in which the index k changes based upon a k-radix; and
   outputting a calculated analysis according to the loading of the data into the cache and the Fourier transforms of the first, second, and/or third data dimensions loaded in the cache.

2. The method according to claim 1, wherein the performing of the Fourier transform of the third dimension comprises:
   loading into the cache each unit of a two-dimensional array data x (i, j*, k) having the indexes i and j and having a value $\geqq 0$ as the index j*; and
   performing a Fourier transform of the third dimension in a direction in which the index k changes for a multiplicity in the i direction while prioritizing an arithmetic operation in a direction in which i continuously changes based upon the i-radix.

3. The method according to claim 2, wherein each Fourier transform of the first, second, and third dimensions is performed by factorizing a possible value of an index expressing each dimension into radixes, and performing a repeating process of a small Fourier transform based on the radixes and multiplication of a rotation factor.

4. The method according to claim 3, wherein in the small Fourier transform, each row is read from a two-dimensional array loaded into cache, a data length is factorized into radixes, data is regarded as a two-dimensional array of (radixes × an integer), and a result is stored as an transposed array in a work area.

5. The method according to claim 1, wherein reversed bits in a first dimension direction and reversed bits in a second dimension direction simultaneously are obtained while data to be bit-reversed is in a register.

6. The method according to claim 5, wherein the simultaneously obtained reversed bits are obtained when a length of data to be Fourier transformed is expressed by a power of 2.

7. The method according to claim 1 or 2, wherein the Fourier transform is performed in a method of Cooley-Tukey.

8. A computer readable recording medium storing a program for controlling a shared memory scalar parallel computer to realize a three-dimensional Fourier transform for use with the computer, which stores, in a continuous area, data in a direction in which i of input data x (i, j, k) is continuously arranged, where an index of a first dimension is i, an index of a second dimension is j, and an index of a third dimension is k in high-speed access to the continuous data area, according to operations comprising:

loading into a cache each unit of a two-dimensional array data x (i, j, k*) having the indexes i and j and having a value $\geqq 0$ as the index k*;

performing a Fourier transform of the first dimension in a direction in which the index i changes for a multiplicity in the j direction with the i continuously changed based upon a j-radix;

performing a Fourier transform of the second dimension in a direction in which the index j changes for a multiplicity in the i direction while prioritizing an arithmetic operation in a direction in which the i continuously changes based upon an i-radix;

performing a Fourier transform of the third dimension in a direction in which the index k changes based upon a k-radix; and outputting a calculated analysis according to the loading of the data into the cache and the Fourier transforms of the first, second, and/or third data dimensions loaded in the cache.

9. The computer readable recording medium according to claim 8, wherein the performing of the Fourier transform of the third dimension comprises:

loading into the cache each unit of a two-dimensional array data x (i, j*, k) having the indexes i and j and having a value $\geqq 0$ as the index j; and performing a Fourier transform of the third dimension in a direction in which the index k changes for a multiplicity in the i direction while prioritizing an arithmetic operation in a direction in which i continuously changes based upon the i-radix.

10. The computer readable recoding medium according to claim 8, wherein reversed bits in a first dimension direction and reversed bits in a second dimension direction simultaneously are obtained while data to be bit-reversed is in a register.

11. A shared memory scalar parallel computing apparatus executing a three-dimensional Fourier transform by storing in a continuous area, data in a direction in which i of input data x (i, j, k) is continuously arranged, where an index of a first dimension is i, an index of a second dimension is j, and an index of a third dimension is k in high-speed access to the continuous data area, the apparatus comprising:

a loading unit loading into each unit of a two-dimensional array data x (i, j, k*) having the indexes i and j and having a value $\geqq 0$ as the index k*;

a first dimension transform unit performing a Fourier transform of the first dimension in a direction in which the index i changes for a multiplicity in the j direction with the i continuously changed based upon the j-radix;

a second dimension transform unit performing a Fourier transform of the second dimension in a direction in which the index j changes for a multiplicity in the i direction while prioritizing an arithmetic operation in a direction in which the i continuously changes based upon an i-radix;

a third dimension transform unit performing a Fourier transform of the third dimension in a direction in which the index k changes based upon a k-radix; and an output unit outputting a calculated analysis according to the loading of the data into the cache and the Fourier transforms of the first, second, and/or third data dimensions loaded in the cache.

12. The apparatus according to claim 11, wherein the third dimension transform unit comprises:

a unit loading into the cache each unit of a two-dimensional array data x (i, j*, k) having the indexes i and j and having a value $\geqq 0$ as the index j*; and a unit for performing a Fourier transform of the third dimension in a direction in which the index k changes for a multiplicity in the i direction while prioritizing an arithmetic operation in a direction in which i continuously changes based upon the i-radix.

13. The apparatus according to claim 11, wherein reversed bits in a first dimension direction and reversed bits in a second dimension direction simultaneously are obtained while data to be bit-reversed is in a register.

\* \* \* \* \*

UNITED STATES PATENT AND TRADEMARK OFFICE
CERTIFICATE OF CORRECTION

PATENT NO.       : 7,467,053 B2                                  Page 1 of 1
APPLICATION NO.  : 11/452360
DATED            : December 16, 2008
INVENTOR(S)      : Makoto Nakanishi It is certified that error appears in the above-identified patent and that said Letters Patent is hereby corrected as shown below:

Column 21, Line 30, change "j;" to --j*;--.

Column 21, Line 36, change "recoding" to --recording--.

Signed and Sealed this

Tenth Day of March, 2009

JOHN DOLL
*Acting Director of the United States Patent and Trademark Office*